(12) United States Patent
Onitsuka

(10) Patent No.: US 9,857,972 B2
(45) Date of Patent: Jan. 2, 2018

(54) OPERATION DEVICE

(71) Applicant: OMRON Corporation, Kyoto-shi, Kyoto (JP)

(72) Inventor: Hiroyuki Onitsuka, Gifu (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 14/743,336

(22) Filed: Jun. 18, 2015

(65) Prior Publication Data

US 2015/0371747 A1    Dec. 24, 2015

(30) Foreign Application Priority Data

Jun. 18, 2014  (JP) ................................ 2014-125686

(51) Int. Cl.
| | |
|---|---|
| *H01H 9/00* | (2006.01) |
| *G06F 3/0489* | (2013.01) |
| *G07F 17/32* | (2006.01) |
| *H01F 7/14* | (2006.01) |
| *G06F 3/01* | (2006.01) |
| *G06F 3/0485* | (2013.01) |
| *G06F 3/0362* | (2013.01) |
| *G07F 17/34* | (2006.01) |

(52) U.S. Cl.
CPC ............ *G06F 3/0489* (2013.01); *G06F 3/016* (2013.01); *G06F 3/0362* (2013.01); *G06F 3/0485* (2013.01); *G07F 17/3209* (2013.01); *H01F 7/14* (2013.01); *G07F 17/34* (2013.01)

(58) Field of Classification Search
CPC ....... G05G 5/03; G07F 17/3209; G07F 17/34; G08B 6/00; H01H 36/0073

USPC ....................................................... 335/205
See application file for complete search history.

(56) References Cited

U.S. PATENT DOCUMENTS

| | | | | |
|---|---|---|---|---|
| 3,584,496 A * | 6/1971 | Keller | ................... | H01R 43/04 310/14 |
| 3,899,703 A * | 8/1975 | Kinnison | ............... | H02K 49/10 310/103 |
| 4,095,795 A * | 6/1978 | Saxton | ................ | G07F 17/3241 463/20 |
| 4,273,334 A * | 6/1981 | Schone | ..................... | H02K 7/10 273/143 R |
| 4,465,439 A * | 8/1984 | Seino | ...................... | F04B 17/00 417/417 |
| 4,687,981 A * | 8/1987 | Okada | ..................... | G07F 17/34 318/685 |
| 4,715,604 A * | 12/1987 | Okada | ..................... | G07F 17/34 273/143 R |
| 4,772,815 A * | 9/1988 | Harned | ................ | G01D 5/2046 310/171 |

(Continued)

FOREIGN PATENT DOCUMENTS

JP    5373490 B2    12/2013

*Primary Examiner* — Shawki S Ismail
*Assistant Examiner* — Lisa Homza
(74) *Attorney, Agent, or Firm* — Osha Liang LLP

(57) ABSTRACT

An operation device for performing an operation input on a play machine has an operation unit, a support that rotatably supports the operation unit, a first magnetic member that rotates integrally with the operation unit, a second magnetic member in which a magnetic force acts between the first magnetic member and the second magnetic member, and a switching unit that switches a distance between the first magnetic member and the second magnetic member.

13 Claims, 16 Drawing Sheets

(56) References Cited

U.S. PATENT DOCUMENTS

| | | | | |
|---|---|---|---|---|
| 4,912,389 A * | 3/1990 | Eguchi | G07F 17/34 | 250/231.14 |
| 5,058,893 A * | 10/1991 | Dickinson | G07C 3/00 | 273/143 R |
| 5,220,161 A * | 6/1993 | Geis | G01D 5/341 | 250/231.13 |
| 5,388,829 A * | 2/1995 | Holmes | G07F 17/3213 | 273/143 R |
| 5,429,507 A * | 7/1995 | Kaplan | G09B 21/003 | 273/141 R |
| 5,879,234 A * | 3/1999 | Mengual | G07F 17/3213 | 273/143 R |
| 5,938,529 A * | 8/1999 | Rodesch | G05B 19/40 | 273/143 R |
| 5,988,638 A * | 11/1999 | Rodesch | G07F 17/32 | 273/143 R |
| 6,129,355 A * | 10/2000 | Hahn | G07F 17/3213 | 273/138.1 |
| 6,802,507 B2 * | 10/2004 | Inoue | G07F 17/34 | 273/143 R |
| 7,137,885 B1 * | 11/2006 | Loose | G07F 17/3202 | 463/16 |
| 7,166,029 B2 * | 1/2007 | Enzminger | G07F 17/3213 | 273/143 R |
| 7,199,546 B2 * | 4/2007 | Nireki | G07F 17/3213 | 273/142 H |
| 7,485,038 B2 * | 2/2009 | Rothkranz | G07F 17/3211 | 273/138.1 |
| 7,699,700 B2 * | 4/2010 | Omomo | G07F 17/3202 | 242/390.9 |
| 7,800,469 B2 * | 9/2010 | Hallet | G05G 1/08 | 200/11 TW |
| 7,887,408 B2 * | 2/2011 | Walker | G07F 17/3213 | 463/16 |
| 8,277,304 B1 * | 10/2012 | Rasmussen | G07F 17/34 | 250/231.13 |
| 8,336,409 B2 * | 12/2012 | Edwards | H02K 53/00 | 310/103 |
| 8,344,834 B2 * | 1/2013 | Niiyama | G06F 3/0338 | 335/205 |
| 8,662,984 B2 * | 3/2014 | Haga | G07F 17/3213 | 463/20 |
| 8,663,009 B1 * | 3/2014 | Pacey | G07F 17/3265 | 463/16 |
| D707,302 S * | 6/2014 | Inoue | D21/369 | |
| 8,770,056 B2 * | 7/2014 | Terao | G06F 3/0338 | 335/205 |
| 9,124,154 B2 * | 9/2015 | Hochberg | H02K 7/1876 | |
| 9,370,716 B2 * | 6/2016 | Munakata | A63F 13/27 | |
| 2010/0099483 A1 * | 4/2010 | Bleich | G07F 17/3202 | 463/20 |
| 2010/0102507 A1 * | 4/2010 | Bontempo | A63F 5/00 | 273/142 R |
| 2012/0115568 A1 * | 5/2012 | Fujisawa | G07F 17/34 | 463/20 |
| 2012/0115569 A1 * | 5/2012 | Fujisawa | G07F 17/34 | 463/20 |
| 2012/0276975 A1 * | 11/2012 | Tanimura | G07F 17/3213 | 463/17 |
| 2013/0023346 A1 * | 1/2013 | Greenberg | G07F 17/3202 | 463/46 |
| 2013/0127279 A1 * | 5/2013 | Jang | H02K 23/04 | 310/152 |
| 2013/0310138 A1 * | 11/2013 | Kitamura | G07F 17/3213 | 463/20 |
| 2014/0057721 A1 * | 2/2014 | Loose | G07F 17/3202 | 463/37 |
| 2014/0073409 A1 * | 3/2014 | Lesley | A63F 13/06 | 463/25 |
| 2014/0094308 A1 * | 4/2014 | Lesley | A63F 13/02 | 463/37 |
| 2014/0094310 A1 * | 4/2014 | Bleich | A63F 13/02 | 463/38 |
| 2014/0128141 A1 * | 5/2014 | Bontempo | G07F 17/34 | 463/17 |
| 2014/0128157 A1 * | 5/2014 | Munakata | A63F 13/06 | 463/31 |
| 2014/0364235 A1 * | 12/2014 | Sugiyama | H03K 17/968 | 463/37 |

* cited by examiner

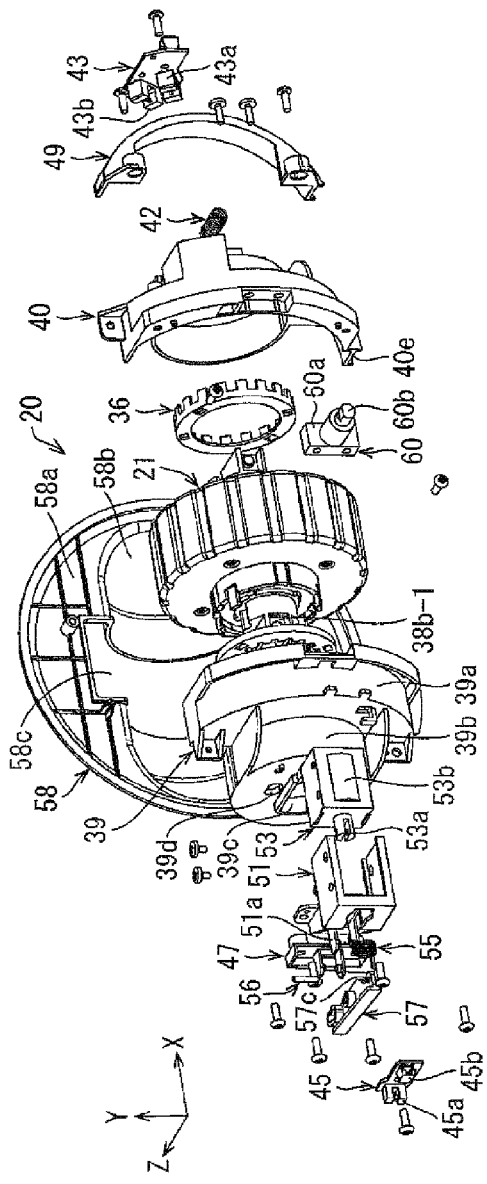
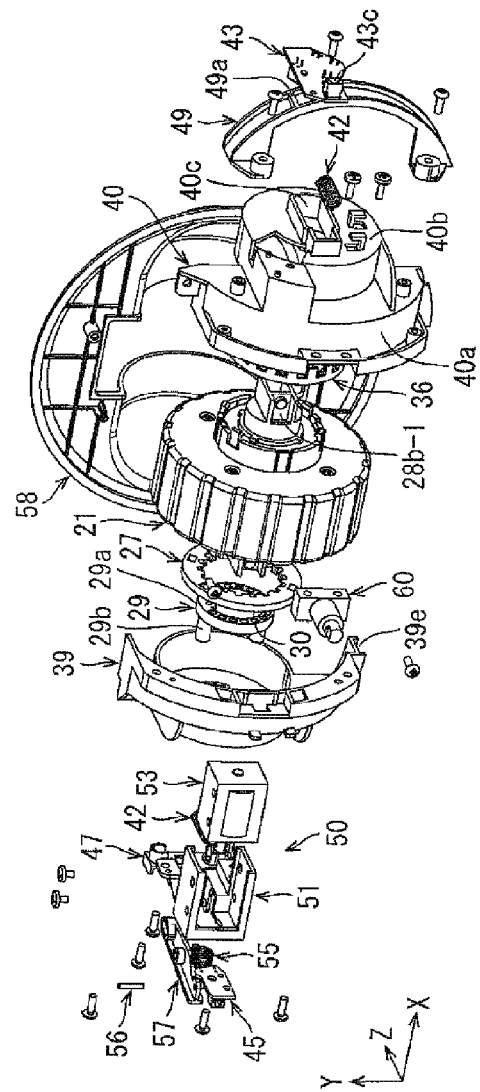
FIG. 5A
FIG. 5B

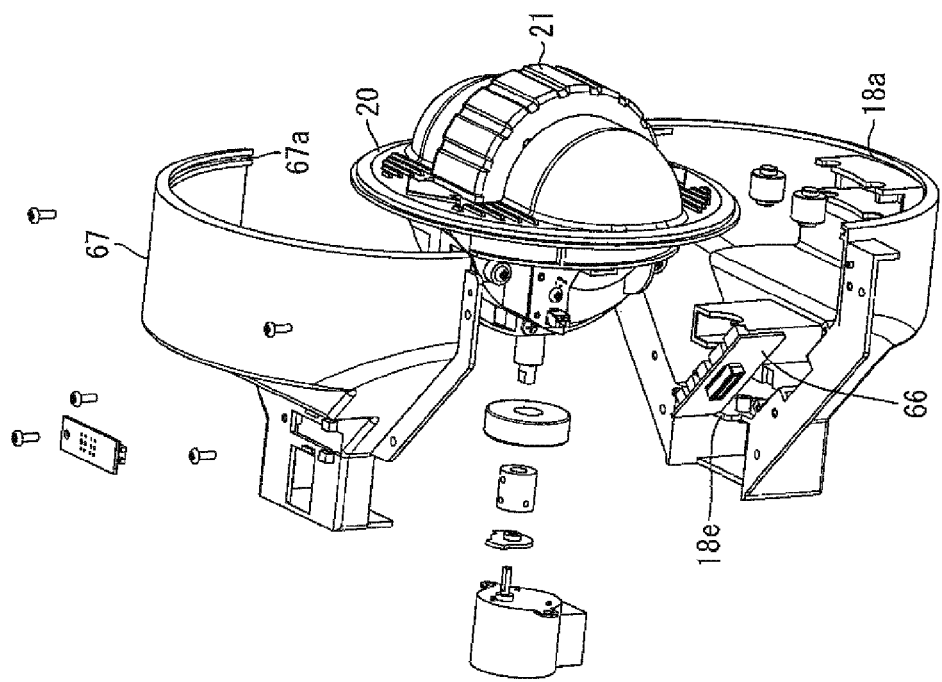
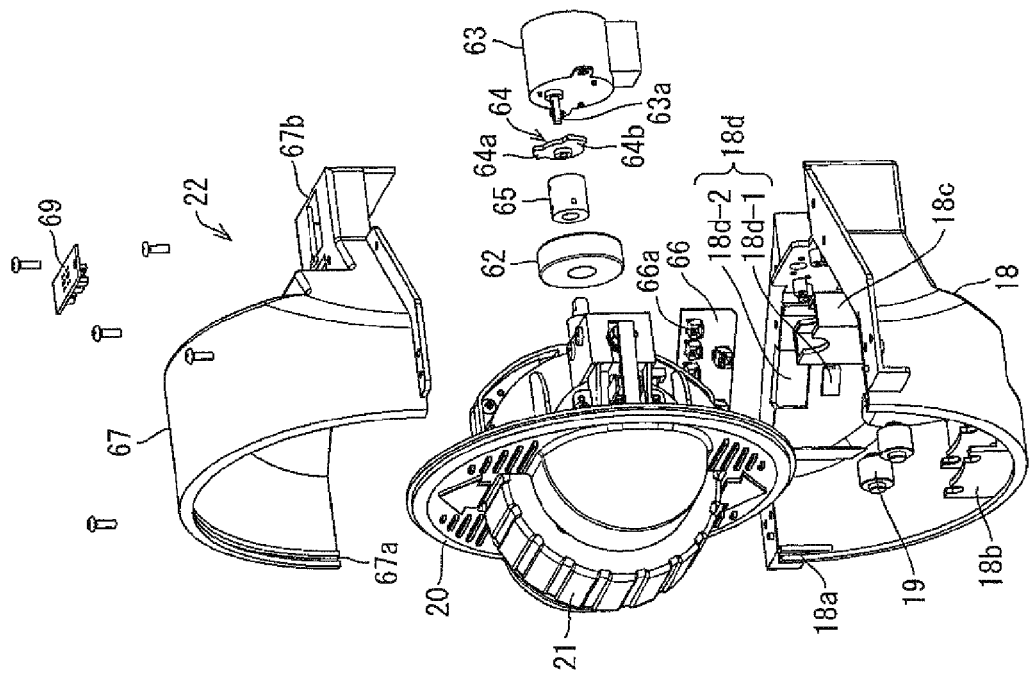

OPERATION DEVICE

CROSS-REFERENCE TO RELATED APPLICATION

This application is based on Japanese Patent Application No. 2014-125686 filed with the Japan Patent Office on Jun. 18, 2014, the entire contents of which are incorporated herein by reference.

BACKGROUND

1. Field

The present invention relates to an operation device included in a play machine.

2. Related Art

Conventionally, there is a play machine called a slot machine. In the slot machine, when a plurality of reels in which a plurality of kinds of symbols are displayed rotate and stop, a role is decided depending on the combination of the symbols or matched symbols along a certain line, and a prize winning is provided according to the decided role and a bet number.

In many cases, a plurality of operating buttons installed in the play machine such as the slot machine (in addition, a pachinko machine and a game machine) are each used as a single function of inputting a previously-set instruction. For example, in the slot machine, a LINE button (a button used to decide the line that is a prize providing target), a BET button (a button used to decide the bet number), a SERVICE button (a button used to call a staff), and a COLLECT button (a button used in adjustment) are arranged on an operation panel.

Nowadays, however, there is well known a play machine including an operation device that has not only the single function but also a plurality of functions. For example, Japanese Patent No. 5373490 discloses a play machine including a dial-push type operation switch that allows for a rotation operation and a pressing movement operation. The play machine including the operation switch enhances a player's interest to prevent a play from becoming monotonous.

SUMMARY

However, in a conventional operation switch, the operational feeling may not change when the rotation operation is performed, which results in a low performance effect.

An operation device according to one or more embodiments of the present invention has a high performance effect.

In accordance with one or more embodiments of the present invention, an operation device for performing an operation input on a play machine, the operation device includes: an operation unit; a support configured to rotatably support the operation unit; a first magnetic member configured to rotate integrally with the operation unit; a second magnetic member in which a magnetic force acts between the first magnetic member and the second magnetic member; and a switching unit configured to switch a distance between the first magnetic member and the second magnetic member.

In the above configuration, the switching unit switches a distance between the first magnetic member and the second magnetic member to another distance to change a magnetic force acting between the first magnetic member and the second magnetic member, which allows the switching of the operational feeling of the operation unit. Therefore, the high-performance-effect operation device can be provided.

In the operation device, one of the first magnetic member and the second magnetic member may be a magnet, and the other may be a magnetic material on which an attractive force of the magnet is exerted by a magnetic force of the magnet.

In the operation device, the other of the first magnetic member and the second magnetic member may have an annular shape including a projection projecting toward a radial inside, and be disposed coaxially with a rotation axis of the operation unit, the one of the first magnetic member and the second magnetic member may include at least one magnetic member and be disposed at predetermined intervals on a circumference about the rotation axis of the operation unit, the circumference having a diameter smaller than an inner diameter of the annular shape of the other of the first magnetic member and the second magnetic member, and the switching unit may move the second magnetic member in a rotation axis direction of the operation unit to switch between a first state in which the one of the first magnetic member and the second magnetic member is located on the radial inside of the other having the annular shape and a second state in which the one of the first magnetic member and the second magnetic member is not located on the radial inside of the other.

In the operation device, the other of the first magnetic member and the second magnetic member may have an annular shape including a projection projecting toward a radial outside, and is disposed coaxially with a rotation axis of the operation unit, the one of the first magnetic member and the second magnetic member may include at least one magnetic member and be disposed at predetermined intervals on a circumference about the rotation axis of the operation unit, the circumference having a diameter larger than an outer diameter of the annular shape of the other of the first magnetic member and the second magnetic member, and the switching unit may move the second magnetic member in a rotation axis direction of the operation unit to switch between a first state in which the one of the first magnetic member and the second magnetic member is located on the radial outside of the other having the annular shape and a second state in which the one of the first magnetic member and the second magnetic member is not located on the radial outside of the other.

In the above configuration, a rotation position where the magnet that is the one of the first magnetic member and the second magnetic member faces the projection that is the other and a rotation position where the magnet that is the one of the first magnetic member and the second magnetic member does not face the projection that is the other exist in the first state of the operation unit. A magnetic force acting between the magnet and the projection varies because a distance from the magnet to the projection varies between the rotation positions. Therefore, when rotating the operation unit, the player can obtain a feeling of the continuously changing resistance force of the operation unit. Because the resistance force against the rotation of the operation unit is strengthened at the rotation position where the magnet faces the projection, the player can recognize the rotation position and obtain a latching feeling (click feeling). In the second state, the distance between the first magnetic member and the second magnetic member is lengthened to decrease the influence of the magnetic force between the first magnetic member and the second magnetic member compared with the first state. As a result, the player can obtain the smooth operational feeling. The player obtains different operational feelings between the first state and the second state, so that the performance effect of the operation device can be enhanced.

In the operation device, the other of the first magnetic member and the second magnetic member may include a plurality of magnetic members and the plurality of magnetic members may be disposed at predetermined intervals on a circumference about a rotation axis of the operation unit, the one of the first magnetic member and the second magnetic member may include at least one magnetic member and be disposed at predetermined intervals on a circumference about the rotation axis of the operation unit, and the switching unit may move the second magnetic member in a rotation axis direction of the operation unit to switch between a first state in which the one of the first magnetic member and the second magnetic member is located on a radial outside or a radial inside of the other and a second state in which the one of the first magnetic member and the second magnetic member is not located on the radial outside or the radial inside of the other.

In the above configuration, the rotation position where the magnet that is the one of the first magnetic member and the second magnetic member faces the projection that is the other and the rotation position where the magnet that is the one of the first magnetic member and the second magnetic member does not face the projection that is the other exist in the first state of the operation unit. A magnetic force acting between the magnet and the projection varies because a distance from the magnet to the projection varies between the rotation positions. Therefore, when rotating the operation unit, the player can obtain a feeling of the continuously changing resistance force of the operation unit. Because the resistance force against the rotation of the operation unit is strengthened at the rotation position where the magnet faces the projection, the player can recognize the rotation position and obtain the latching feeling (click feeling). In the second state, the distance between the first magnetic member and the second magnetic member is lengthened to decrease the influence of the magnetic force between the first magnetic member and the second magnetic member compared with the first state. As a result, the player can obtain the smooth operational feeling. The player obtains different operational feelings between the first state and the second state, so that the performance effect of the operation device can be enhanced.

In the operation device, the support may support the operation unit such that a pushing-in operation can be performed, and the support may support the operation unit such that the rotation axis of the operation unit is perpendicular to a push-in direction.

In the above configuration, because both the scrolling operation and the pushing-in operation can be received, the high-operability operation device can be provided.

In the operation device, the switching unit may be a solenoid. Therefore, the high performance effect can be obtained.

One or more embodiments of present invention can provide the high-performance-effect operation device.

BRIEF DESCRIPTION OF THE DRAWINGS

FIGS. 5A and 5B are exploded perspective views illustrating a vertical-horizontal switching unit included in the operation device of FIG. 2;

FIGS. 7A and 7B are exploded perspective views illustrating a frame unit included in the operation device of FIG. 2;

DETAILED DESCRIPTION

Embodiments of the present invention will be described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

(Entire Configuration of Slot Machine)

Figure 1:
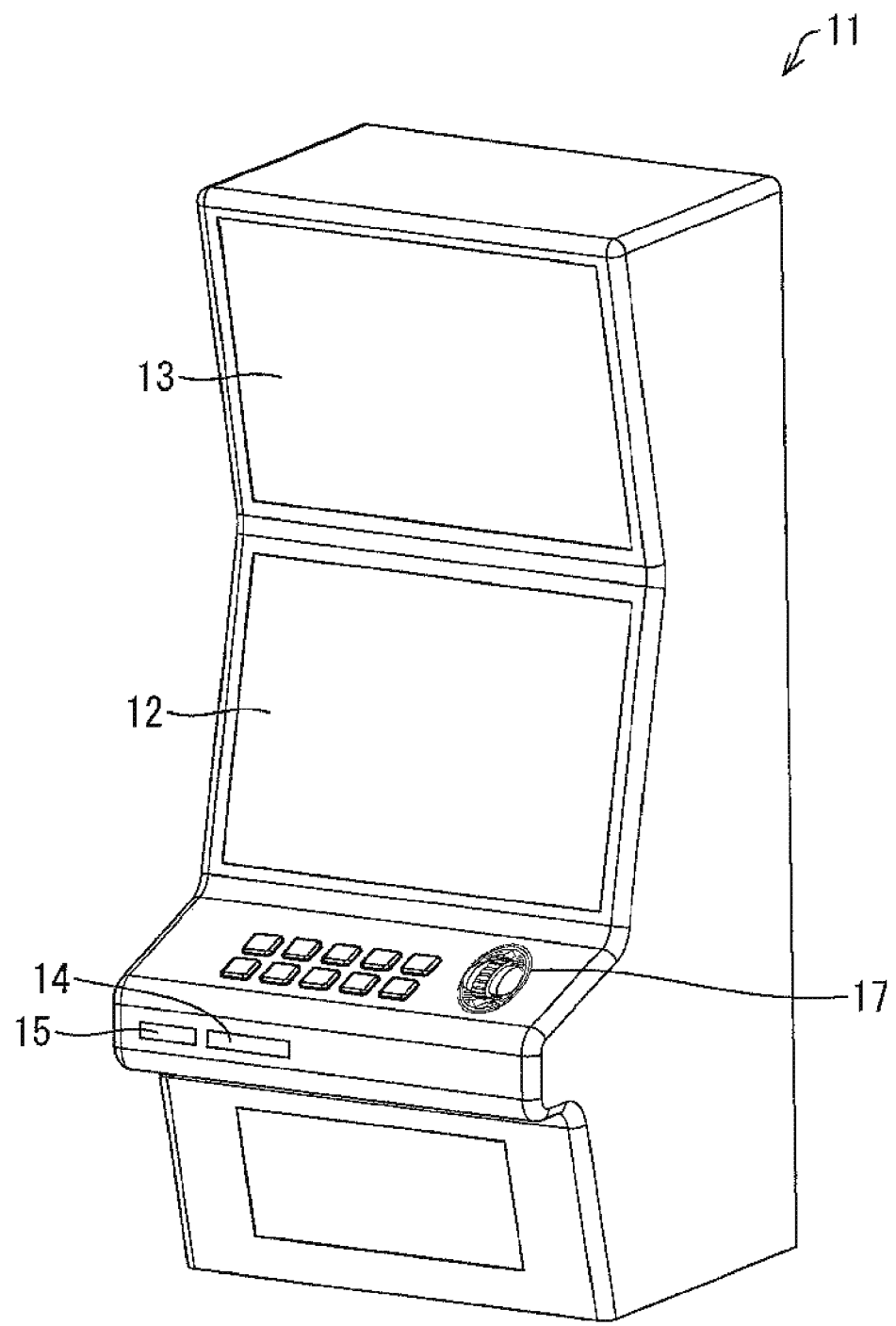
FIG. 1 is a perspective view illustrating a slot machine according to one or more embodiments of the present invention.

FIG. 1 is a perspective view illustrating a configuration of a slot machine (play machine) 11 according to one or more embodiments of the present invention as a play machine. In one or more embodiments of the present invention, the slot machine is described as an example of the play machine. However, the present invention is limited to the slot machine. For example, one or more embodiments of the present invention can be applied to a play machine in another mode such as a pachinko machine and various play machines.

As illustrated in FIG. 1, the slot machine (play machine) 11 includes a reel display region 12, a liquid crystal display 13, a bill insertion port 14, a ticket dispensing port 15, and an operation device 17.

A plurality of reels are displayed in the reel display region 12. The reels can be rotated by a player's operation, a role is decided depending on symbols that are indicated by the reels when the reels are stopped, and a prize winning is provided according to the role. As illustrated in FIG. 1, an image corresponding to the reels may be displayed on a screen, or the plurality of reels may be arranged in the reel display region 12. Various pieces of information are displayed on the liquid crystal display 13 according to a play state of the play machine.

The bill insertion port 14 receives a bill that is inserted by a player for the purpose of the play. The ticket dispensing port 15 outputs an adjustment ticket when the play is ended.

An operation of each unit of the slot machine 11 is controlled by a controller (not illustrated) included in the slot machine 11. For example, the controller is constructed with a CPU (Central Processing unit). The controller controls the operation of each unit of the slot machine 11 based on the detection results of various sensors included in the slot machine 11, an operation instruction issued to the operation device 17 by the player, and a program and various pieces of data stored in a storage unit (not illustrated) such as a ROM.

(Schematic Configuration of Operation Device)

Figure 2:
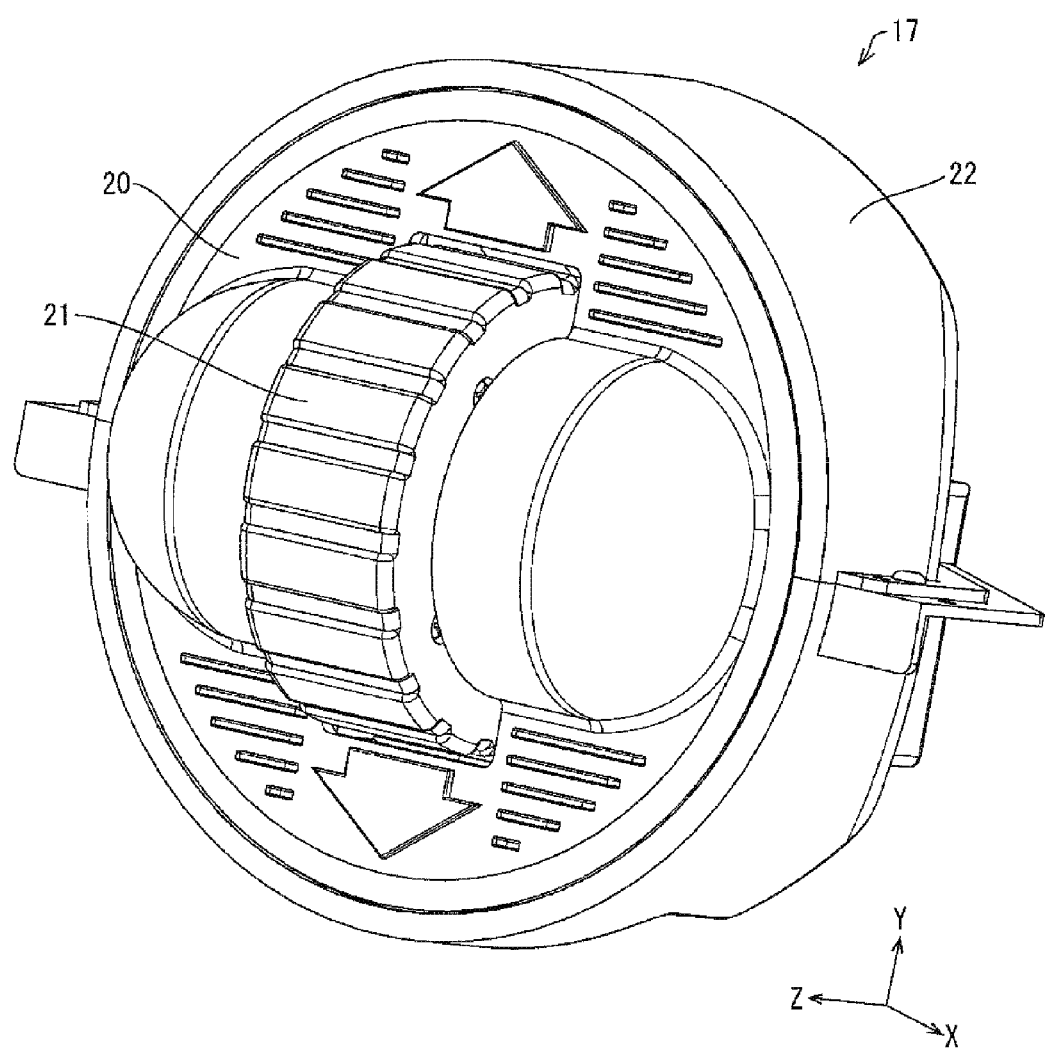
FIG. 2 is a perspective view illustrating an operation device included in the slot machine of FIG. 1.

FIG. 2 is a perspective view illustrating an appearance of the operation device 17. The operation device 17 can receive a pushing-in operation and a rotation operation (in one or more embodiments of the present invention, the rotation operation is mainly an operation to scroll a cursor on the liquid crystal display 13 or the like, and hereinafter referred to as a scrolling operation) of the player. For convenience, it is assumed that a direction in which the player performs the pushing-in operation when operating the operation device 17 is a negative direction (rearward) of an axis Z, and that a positive direction of the axis Z is forward. On an XY-plane perpendicular to the axis Z, it is assumed that the right direction viewed from the player is the positive direction of an axis X, and that the negative direction of the axis X is the left. Similarly, on an axis Y that is perpendicular to the axis X and axis Z and constitutes a right-handed system together with the axis X and axis Z, it is assumed that the positive direction of the axis Y is upward, and that the negative direction of the axis Y is downward. Hereinafter, the axes X, Y, and Z indicate directions identical to those in FIG. 2.

Figure 3C:
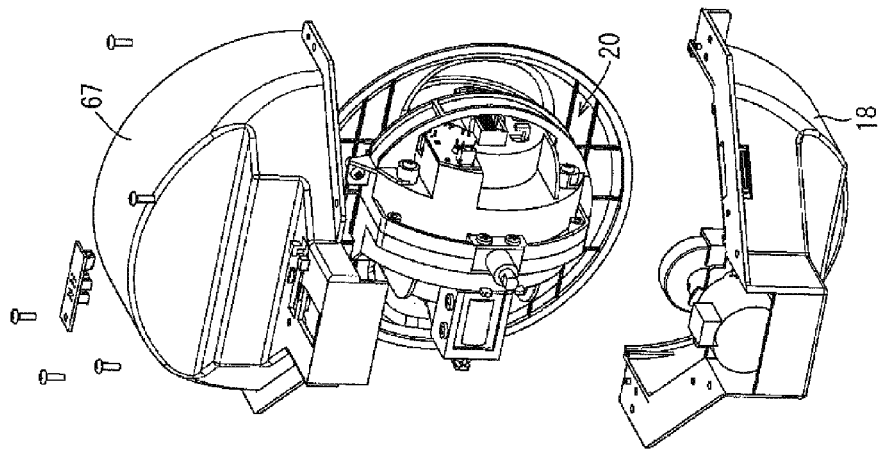
FIGS. 3A to 3C are exploded perspective views of the operation device in FIG. 2.
Figure 3B:
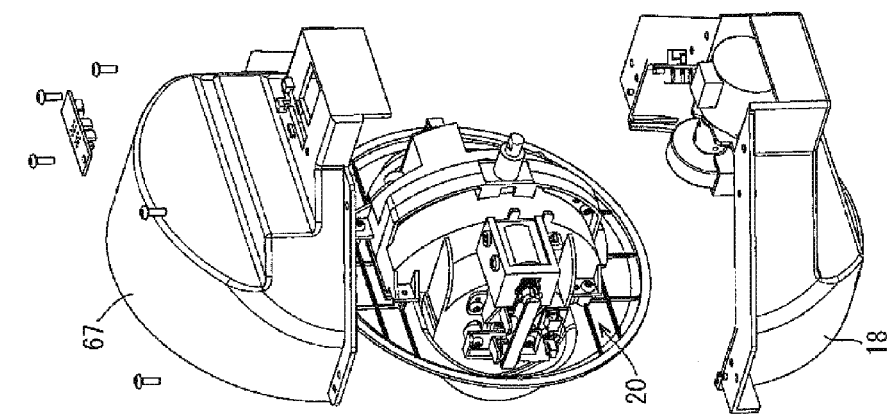
Figure 3A:
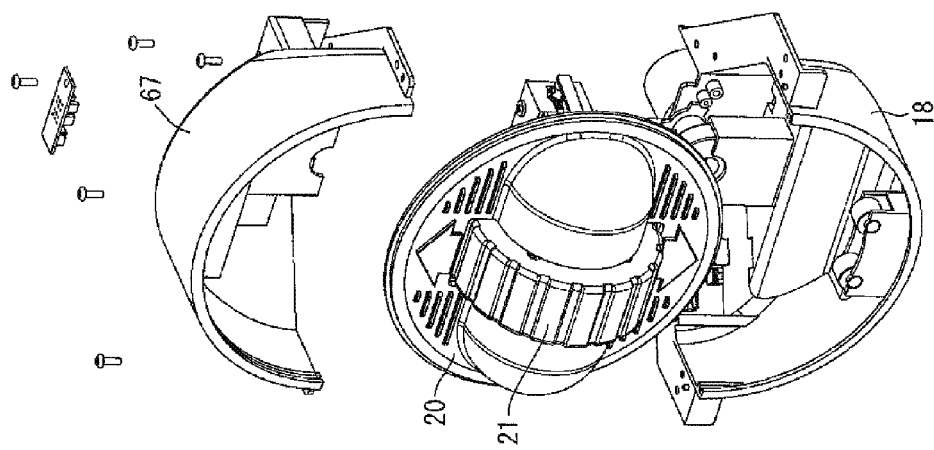

FIGS. 3A to 3C are exploded perspective views of the operation device 17, in which FIG. 3A is a view illustrating the operation device 17 when the operation device 17 is viewed from an obliquely front right, FIG. 3B is a view illustrating the operation device 17 when the operation device 17 is viewed from an obliquely rear right, and FIG. 3C is a view illustrating the operation device 17 when the operation device 17 is viewed from an obliquely rear left. As illustrated in FIGS. 2 and 3A to 3C, the operation device 17 includes a vertical-horizontal switching unit (support) 20, an operation unit 21, and a frame unit 22.

The operation unit 21 having a substantially columnar shape receives the scrolling operation and pushing-in operation of the player.

The vertical-horizontal switching unit 20 rotatably supports the operation unit 21 with a substantially columnar shaft included in the operation unit 21 as a rotation axis (first rotation axis), and supports the operation unit 21 such that the operation unit 21 is movable in the negative direction (rearward) of the axis Z. The scrolling operation is received by the rotation of the operation unit 21, and the pushing-in operation is received by the movement of the operation unit 21 in the negative direction of the axis Z. In the vertical-horizontal switching unit 20, the frame unit 22 enables the rotation (switching) of the rotation axis of the operation unit 21 on the XY-plane about an axis (second rotation axis) perpendicular to the rotation axis of the operation unit 21. In other words, the vertical-horizontal switching unit 20 supports the operation unit 21 such that the rotation axis of the operation unit 21 can be switched to any one of a plurality of predetermined directions on the XY-plane. Although only the case that the rotation axis of the operation unit 21 is parallel to the axis X (hereinafter, referred to as a vertical position) and the case that the rotation axis is parallel to the axis Y (hereinafter, referred to as a horizontal position) are switched in one or more embodiments of the present invention, the present invention is not limited to the cases. The rotation axis of the operation unit 21 may be configured to be switched to a predetermined direction in the XY-plane. Unless otherwise noted, the case that the rotation axis of the operation unit 21 is parallel with the axis X (vertical position) will be described below. In the vertical-horizontal switching unit 20, the rotation axis of the operation unit 21 switches between the vertical position and the horizontal position by the controller included in the slot machine 11.

The frame unit 22 includes an upper main frame 67 and a lower main frame 18. In the frame unit 22, the vertical-horizontal switching unit 20 is sandwiched between the upper main frame 67 and the lower main frame 18, and the upper main frame 67 and the lower main frame 18 are fixed to each other by a plurality of screws, thereby retaining the vertical-horizontal switching unit 20.

Detailed configurations of the operation unit 21, the vertical-horizontal switching unit 20, and the frame unit 22 will be described below.

(Configuration of Operation Unit 21)

Figure 4A:
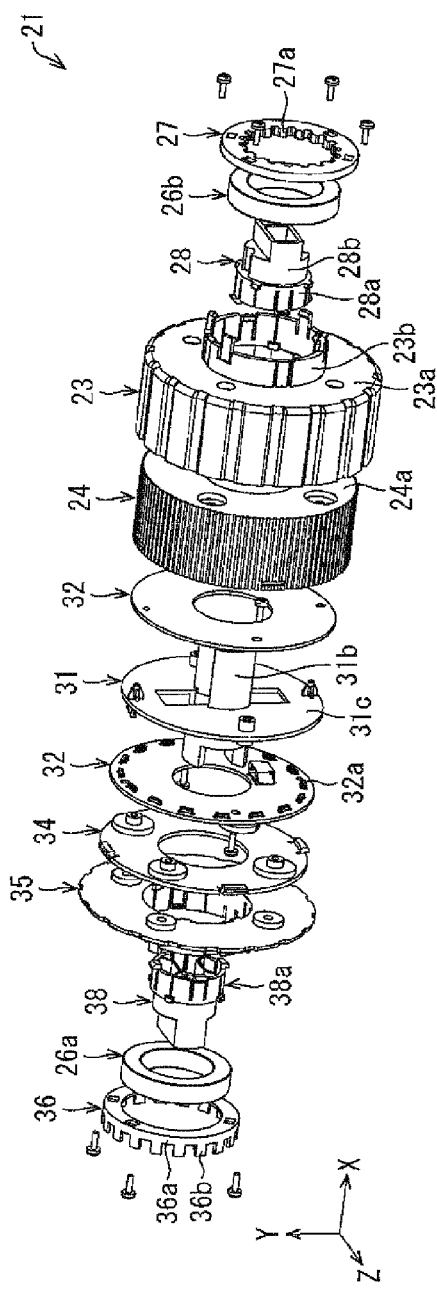
FIGS. 4A and 4B are exploded perspective views illustrating an operation unit included in the operation device of FIG. 2.
Figure 4B:
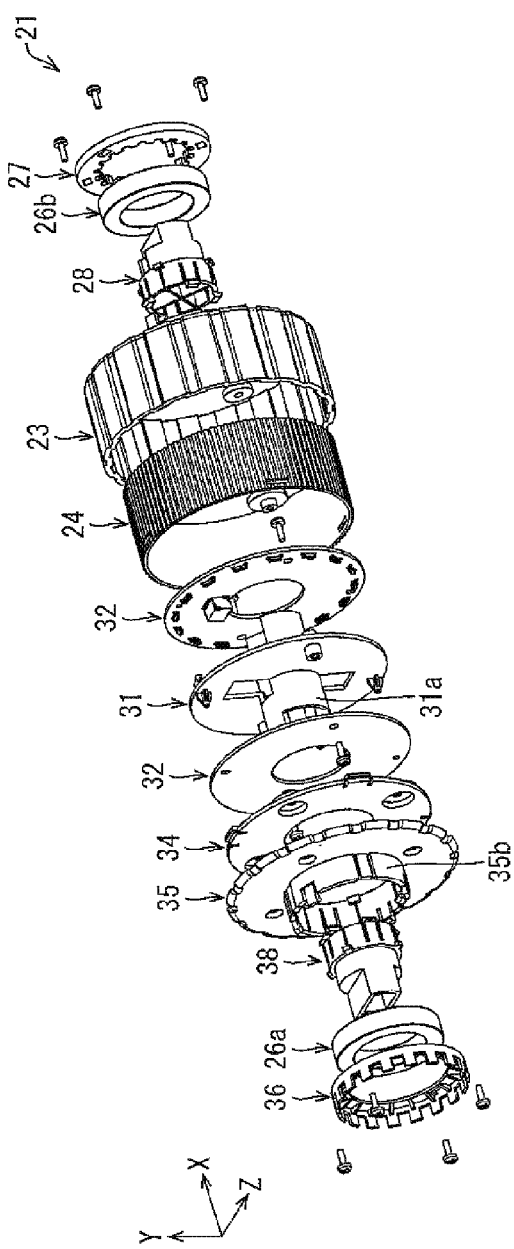

FIGS. 4A and 4B are exploded perspective views of the operation unit 21. As illustrated in FIGS. 4A and 4B, the operation unit 21 includes a right case 23, a right diffusion case 24, a bearing 26a, a bearing 26b, a plate (first magnetic member) 27, a right shaft 28, a holder 31, two electric spectacular circuit boards 32, a left diffusion case 34, a left case 35, a scrolling detecting flag 36, and a left shaft 38, and all the above components of the operation unit 21 are disposed coaxially with the rotation axis of the operation unit 21.

The holder 31 includes a left shaft unit 31a, a right shaft unit 31b, and a disc unit 31c. The left shaft unit 31a and the right shaft unit 31b each having a cylindrical shape extend leftward and rightward, respectively, from the center of the disc unit 31c along a rotation axis direction of the operation unit 21. Outer diameters of the left shaft unit 31a and right shaft unit 31b are smaller than an outer diameter of the disc unit 31c, and the left shaft unit 31a and right shaft unit 31b are coaxially formed in the center of the disc unit 31c. The holder 31 includes a plurality of screw holes projecting horizontally along the rotation axis direction of the operation unit 21 in the neighborhood of an outer circumference.

The two electric spectacular circuit boards 32 are each a plate-like member having a substantially annular shape, and are disposed on both sides of the holder 31 so as to sandwich the holder 31 therebetween. A hollow portion of the electric spectacular circuit board 32 has a size corresponding to the left shaft unit 31a or right shaft unit 31b of the holder 31, and the electric spectacular circuit board 32 is supported by the holder 31 while the left shaft unit 31a or the right shaft unit 32b is inserted in the hollow portion. The electric spectacular circuit board 32 has holes at positions corresponding to the screw holes of the holder 31. The screw is inserted in the screw hole of the holder 31 through the hole to fix the electric spectacular circuit board 32 to the holder 31. Each of the electric spectacular circuit boards 32 includes a plurality of LEDs 32a on the side of the disc unit 31c of the holder 31. The plurality of LEDs 32a are circumferentially arranged at constant intervals in the neighborhood of the outer circumference of the electric spectacular circuit board 32. The plurality of LEDs 32a emit light toward a radial outside of the electric spectacular circuit board 32 by energization from the electric spectacular circuit board 32.

The right diffusion case 24 is a hollow member having a substantially cylindrical shape, and a left end of the right diffusion case 24 is opened. An annular unit 24a ranging to a radial inside is formed at a right end of the right diffusion case 24. Engagement holes are circumferentially made at the left end of the right diffusion case 24. In the right diffusion case 24, many grooves are provided along the axial direction on the outer circumference in order to diffuse the light emitted from the LEDs 32a provided on the electric spectacular circuit board 32.

The left diffusion case 34 is an annular plate-like member having the outer diameter substantially equal to the inner diameter at the left end of the right diffusion case 24, and the left diffusion case 34 includes engagement hooks at the positions corresponding to the engagement holes of the right diffusion case 24. Therefore, the left diffusion case 34 engages the right diffusion case 24 to accommodate the disc unit 31c of the holder 31 and the electric spectacular circuit boards 32. The left shaft unit 31a of the holder 31 projects on the left side of the left diffusion case 34, and the right shaft unit 31b of the holder 31 projects to the annular unit 24a of the right diffusion case 24.

The right case 23 is a hollow member having a substantially cylindrical shape, and has the inner diameter larger than the outer diameter of the right diffusion case 24. Similarly to the right diffusion case 24, the right case 23 includes an annular unit 23a ranging to the radial inside at the right end of the right case 23. The right case 23 includes a cylindrical projection 23b that extends on the right side coaxially with the right shaft unit 31b of the holder 31 while being formed along the inner circumference of the annular unit 23a. The projection 23b includes a plurality of latch hooks on the outer circumference. The right case 23 and the right diffusion case 24 are fixed to each other by screws.

The left case 35 is an annular plate-like member having the outer diameter substantially equal to the outer diameter of the right case 23. Similarly to the right case 23, the left case 35 includes a cylindrical projection 35b that extends on the left side coaxially with the left shaft unit 31a of the holder 31 while being formed along the inner diameter. The projection 35b includes a plurality of latch hooks on the outer circumference. The left case 35 and the left diffusion case 34 are fixed to each other by screws. Therefore, the right diffusion case 24, the left diffusion case 34, the right case 23, and the left case 35 are integrally operated.

The right shaft 28 includes a bearing retaining unit 28a and a shaft support unit 28b. The bearing retaining unit 28a is a hollow member having the substantially cylindrical shape, and has the inner diameter slightly larger than the outer diameter of the right shaft unit 31b of the holder 31. The right shaft unit 31b is inserted in the bearing retaining unit 28a, whereby the holder 31 and the right shaft 28 are fixed to each other so as not to rotate relative to each other. The shaft support unit 28b includes an upper surface and a lower surface, and the upper surface and the lower surface extend rightward from the bearing retaining unit 28a in parallel with an XZ-plane. The upper surface and the lower surface are used to guide movement of the operation unit 21 in a push-in direction. There is no particular limitation to the upper surface and the lower surface as long as the upper surface and the lower surface are parallel to the push-in direction (Z-direction). In one or more embodiments of the present invention, the upper surface and the lower surface are parallel to the XZ-plane. The shaft support unit 28b includes a push-in spring support 28b-1 (see FIG. 5B) near a rear end. The push-in spring support 28b-1 constitutes a surface perpendicular to the push-in direction formed between the upper surface and lower surface.

The left shaft 38 and the right shaft 28 are substantially plane-symmetrical with respect to the surface perpendicular to the rotation axis of the operation unit 21. Similarly to the right shaft 28, the left shaft 38 includes a push-in spring support 38b-1 (see FIG. 5A), and the left shaft unit 31a is inserted in the left shaft 38, whereby the holder 31 and the left shaft 38 are fixed to each other so as not to rotate relative to each other.

The bearing 26a and the bearing 26b are ring-shape bearings. The bearing 26b is disposed in a space formed between the projection 23b of the right case 23 and a bearing retaining unit 28a of the right shaft 28. Similarly to the bearing 26b, the bearing 26a is disposed in a space formed between the projection 35b of the left case 35 and a bearing retaining unit 38a of the left shaft 38. The right case 23 and the left case 35 are rotatably supported by the holder 31 with the bearing 26a and bearing 26b interposed therebetween. The bearing 26a abuts on the left case 35 and the left shaft 38, and the bearing 26b abuts on the right case 23 and the right shaft 28. Therefore, during a pushing-in operation, the player pushes in the left case 35 and the right case 23 to move the left shaft 38 and the right shaft 28, and the whole operation unit 21 is integrally operated.

The plate 27 is an annular member (magnetic member) made of a magnetic material. For example, the plate 27 is made of a magnetic material (for example, a ferro-magnetic material such as iron) on which an attractive force of a magnet is exerted. The plate 27 includes a plurality of projections 27a that project radially along the inner circumference like an internal gear. In the plate 27, latch holes are made at the positions corresponding to the latch hooks formed in the projection 23b of the right case 23. The latch hooks are latched in the latch holes of the plate 27, whereby the plate 27 is fixed to the right case 23 so as to abut on the right end of the projection 23b of the right case 23.

The scrolling detecting flag 36 is a ring-shape member that is used to detect whether a scrolling operation is performed on the operation unit 21. The scrolling detecting flag 36 includes a ring unit 36a and a plurality of projections 36b. In the ring unit 36a, engagement holes are made at the positions corresponding to the engagement hooks of the left case 35, and the engagement hooks of the left case 35 are fitted in the engagement holes. Therefore, the scrolling detecting flag 36 is supported by the left case 35, and moves integrally with the left case 35. The plurality of projections 36b extend leftward from a left end face of the ring unit 36a, and are formed at constant intervals along the outer circumference.

(Configuration of Vertical-Horizontal Switching Unit 20)

The vertical-horizontal switching unit 20 will be described below. FIGS. 5A and 5B are exploded perspective views of the vertical-horizontal switching unit 20 when the vertical-horizontal switching unit 20 is viewed from a rear direction (—Z-direction). The operation unit 21 is also illustrated in FIGS. 5A and 5B in order to clarify a positional relationship between the vertical-horizontal switching unit 20 and the operation unit 21.

As illustrated in FIGS. 5A and 5B, the vertical-horizontal switching unit 20 includes a magnet holder 29, a magnet (second magnetic member) 30, a right frame 39, a left frame 40, push-in springs 42, a scrolling detecting circuit board 43, a push-in detecting circuit board 45, a slider 47, a guide rail 49, an operational feeling switching unit 50, a panel 58, and a coupling shaft 60. As illustrated in FIGS. 5A and 5B, the operation unit 21 is disposed inside a region surrounded by the panel 58, the right frame 39, and the left frame 40.

The magnet holder 29 includes a magnet retaining unit 29a and couplers 29b. The magnet holder 29 is disposed on the radial inside of the plate 27 so as to be movable in the rotation axis direction. The magnet retaining unit 29a having a substantially annular shape includes holes that are circumferentially made at constant intervals at the left end face. The holes are made at the positions corresponding to the projections 27a of the plate 27. The two couplers 29b are formed at upper and lower positions across the rotation axis at the right end of the magnet retaining unit 29a, and extend rightward in the axial direction.

The magnet 30 is disposed in the hole of the magnet retaining unit 29a, and supported by the magnet retaining unit 29a.

The right frame 39 includes an operation unit retaining unit 39a and a right cylindrical portion 39b. The operation unit retaining unit 39a has a substantially semi-cylindrical shape in which an arc is drawn rearward, and a front and a left end of the operation unit retaining unit 39a are opened. The operation unit retaining unit 39a has a shape corresponding to a right rear of the operation unit 21, and the right rear of the operation unit 21 is accommodated in the operation unit retaining unit 39a. A flange is formed at the left end of the operation unit retaining unit 39a, and a recess is formed at a rear end of the flange. The right cylindrical portion 39b is a hollow member, which is connected with the operation unit retaining unit 39a and has a diameter smaller than that of the operation unit retaining unit 39a. The right cylindrical portion 39b accommodates the projections 23b of the right case 23 and the right shaft 28 therein, and has the shape corresponding to the projections 23b of the right case 23 and the right shaft 28. The right cylindrical portion 39b projects rightward from the right end of the operation unit retaining unit 39a, and the left end of the right cylindrical portion 39b is opened.

A hole 39c is made in a central portion on the right end face of the right cylindrical portion 39b. The right frame 39 is disposed such that the shaft support unit 28b of the right shaft 28 is located in the hole 39c. Therefore, the hole 39c includes an upper surface and a lower surface, which are parallel to the XZ-plane, and a vertical width (a distance between the upper surface and the lower surface) is substantially equal to a vertical width of the shaft support unit 28b of the right shaft 28. The front of the hole 39c has the shape corresponding to the front of the shaft support unit 28b. A width in the direction of the axis Z of the hole 39c is larger than a width in the direction of the axis Z of the shaft support unit 28b. Therefore, the right cylindrical portion 39b supports the right shaft 28 such that the right shaft 28 is movable inside in a front-back direction.

In the right cylindrical portion 39b, small holes 39d are made above and below the hole 39c. The small hole 39d is a long hole in which the push-in direction (the direction of the axis Z) is set to a longitudinal direction, and the small hole 39d is made at the position corresponding to the coupler 29b of the magnet retaining unit 29a. The coupler 29b is inserted in the small hole 39d.

The left frame 40 is disposed on the opposite side to the right frame 39 with respect to the operation unit 21, and the left frame 40 and the right frame 39 are substantially plane-symmetrical. Therefore, similarly to the right frame 39, the left frame 40 includes an operation unit retaining unit 40a and a left cylindrical portion 40b. However, a window is formed in the left cylindrical portion 40b of the left frame 40. The shaft support unit 38b of the left shaft 38 is disposed inside a hole 40c made in the center of the left cylindrical portion 40b, so that the left frame 40 supports the left shaft 38. The flanges of the left frame 40 and right frame 39 are fixed to each other by screws.

The scrolling detecting circuit board 43 is disposed so as to abut on the left end face of the left frame 40. The scrolling detecting circuit board 43 includes a first sensor 43a, a second sensor 43b, and a connector 43c. The scrolling detecting circuit board 43 is disposed such that the first sensor 43a and the second sensor 43b project toward the operation unit 21 through the window formed in the left cylindrical portion 40b of the left frame 40. Each of the first sensor 43a and the second sensor 43b is a photo-interrupter. The photo-interrupter includes a light emitting unit and a light receiving unit, and detects entry and exit of an object with respect to a space (object detection space) formed between the light emitting unit and the light receiving unit. Each of the first sensor 43a and the second sensor 43b transmits an off signal through the connector 43c when the object does not exist in the object detection space, and each of the first sensor 43a and the second sensor 43b transmits an on signal through the connector 43c when the object exists in the object detection space. Each of the first sensor 43a and the second sensor 43b is disposed such that the projections 36b of the scrolling detecting flag 36 enter and exit from the object detection space.

The coupling shaft 60 is a shaft coupling that connects the vertical-horizontal switching unit 20 and the frame unit 22. The coupling shaft 60 includes a substantially-rectangular-solid rotation unit 60a and a substantially cylindrical connection unit 60b that extends rearward from the rotation unit 60a. The coupling shaft 60 is disposed in and fixed to a region formed by the recesses of the left frame 40 and right frame 39.

The push-in springs 42 are each a spring that is compressed according to the pushing-in operation of the operation unit 21 by the player, and the push-in springs 42 are provided at right and left positions in order to return the operation unit 21 to an unoperated position when the pushing-in operation is ended. The push-in springs 42 are disposed while compressed in the hole 39c of the right frame 39 and the hole 40c of the left frame 40. In the push-in spring 42, the front is supported by the push-in spring support 28b-1 of the shaft support unit 28b or the push-in spring support 38b-1 of the shaft support unit 38b, and the rear is supported by the rear of the hole 39c or hole 40c.

The panel 58 is provided so as to face the player, and includes a disc unit 58a, two hemispherical units 58b, and a groove 58c. The groove 58c is vertically formed in the center of the disc unit 58a, and the operation unit 21 is disposed such that the operation unit 21 projects through the groove 58c, which allows the player to operate the operation unit 21. The two hemispherical units 58b are hollow members that are disposed at right and left positions across the groove 58c. The right cylindrical portion 39b of the right frame 39 and the left cylindrical portion 40b of the left frame 40 are disposed in the hemispherical hollow portions. The right frame 39 and the left frame 40 are fixed to the panel 58 by screws.

The guide rail 49 is an arc member that overhangs leftward about the coupling shaft 60. The guide rail 49 is also a groove type rail member. The rail member includes parallel wall surfaces along the arc in the front and rear, and a distance between the wall surfaces constitutes a rail width. The guide rail 49 is fixed to the left frame 40 by screws, and includes a stopper 49a that is formed between the wall surfaces above the rotation axis of the operation unit 21. The stopper 49a is provided in order to prevent the excessive rotation of the vertical-horizontal switching unit 20. In the left frame 40, a rail unit 40e is formed at the position corresponding to the lower side of the guide rail 49. In the right frame 39, a rail unit 39e is formed at the position corresponding to the rail unit 40e of the left frame 40. The guide rail 49, the rail unit 40e, and the rail unit 39e are connected to each other with the equal rail widths.

Figure 6:
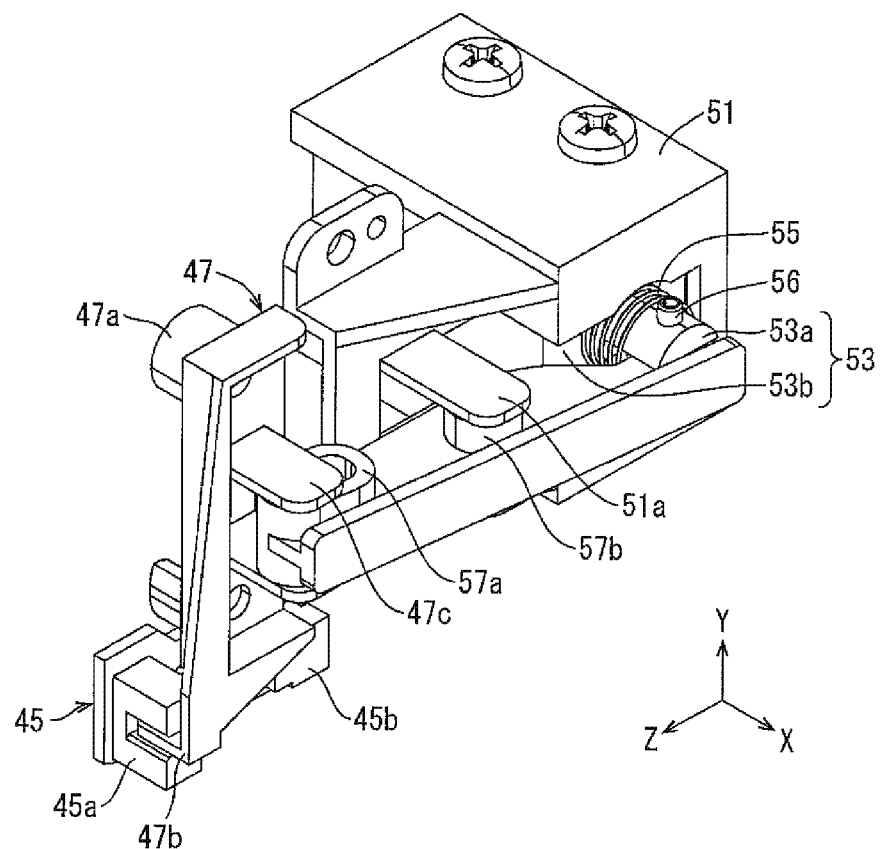
FIG. 6 is a perspective view illustrating an operational feeling switching unit included in the operation device of FIG. 2.

FIG. 6 is a schematic diagram partially illustrating a configuration of the operational feeling switching unit 50. The operational feeling switching unit 50 is used to switch an operational feeling of the scrolling operation to the operation unit 21. As illustrated in FIG. 6, the operational feeling switching unit 50 includes a solenoid holder 51, a solenoid (switching unit) 53, a solenoid spring 55, a spring pin 56, a link 57, a slider 47, and a third sensor 45a.

The solenoid 53 includes a substantially columnar solenoid movable unit 53a projecting rightward and a solenoid fixing unit 53b, and the solenoid 53 is supported by the right frame 39 with the solenoid holder 51 interposed therebetween. The solenoid 53 is excited by the energization to attract the solenoid movable unit 53a onto the side of the right frame 39. The solenoid movable unit 53a includes a vertical through-hole near the right end, and a slit is formed in the solenoid movable unit 53a. The slit extends leftward from the right end to form a plane perpendicular to the through-hole. In the solenoid movable unit 53a, the slit is deeper than the position where the through-hole is made.

The solenoid holder 51 supports the solenoid 53, and is fixed to the right cylindrical portion 39b of the right frame 39 by screws. The solenoid holder 51 includes a link support 51a. The link support 51a supports the link 57 so as to vertically sandwich the link 57.

The slider 47 includes a magnet holder retaining unit 47a, a push-in detecting flag 47b, and a nip unit 47c. The magnet holder retaining unit 47a is fixed to the coupler 29b of the magnet holder 29 by screws, the coupler 29b of the magnet holder 29 projecting from the right frame 39. Therefore, the slider 47 and the magnet holder 29 move integrally. The push-in detecting flag 47b is a plate-like member, which extends leftward and is located in a lower portion of the slider 47. The nip unit 47c is two plate-like members including an upper nip unit and a lower nip unit, and the nip unit 47c is formed so as to vertically sandwich the link 57 and to face upper and lower surfaces of the link 57. In order to secure the connection to the link 57, a downward projection is formed in the upper nip unit and an upward projection is formed in the lower nip unit.

The link 57 is a substantially plate-like member that transmits movement of the solenoid 53 to the slider 47. Therefore, the link 57 is connected with the slider 47, the solenoid holder 51, and the solenoid 53. The link 57 is horizontally disposed such that the direction of the axis Z is set to the longitudinal direction, and three vertical holes, namely, a first hole 57a, second hole 57b, and a third hole 57c (see FIG. 5A) are made in the link 57 from the front toward the rear. Each of the first hole 57a and the second hole 57b includes a wall surface that projects vertically around the hole. The projections formed in the nip unit 47c of the slider 47 are fitted in the first hole 57a. The first hole 57a is a long hole in which the push-in direction (the direction of the axis Z) is set to the longitudinal direction in order that the slider 47 that moves integrally with the operation unit 21 can be slid when the player performs the pushing-in operation on the operation unit 21, and the first hole 57a is connected to the slider 47 such that the slider 47 can be slid. The slider 47 is connected to the link 57 so as to move integrally with the link 57 when the link 57 moves in the horizontal direction (the direction of the axis X) (or the vertical direction (the direction of the axis Y) in the case that the operation unit 21 is horizontally positioned). The second hole 57b of the link 57 is sandwiched between the link support 51a of the solenoid holder 51 such that the link 57 is turnable. During the operation of the solenoid, the link 57 moves with the second hole 57b as a support point. The rear of the link 57 is disposed in the slit formed in the solenoid movable unit 53a, and the third hole 57c is disposed at the position corresponding to the through-hole made in the solenoid movable unit 53a.

The spring pin 56 is disposed so as to pierce the through-hole made in the solenoid movable unit 53a and the third hole 57c of the link 57. Therefore, the solenoid movable unit 53a and the link 57 move integrally.

The solenoid spring 55 is a coil spring, and is disposed outside the solenoid movable unit 53a while being coaxial with the solenoid movable unit 53a. One end of the solenoid spring 55 is supported by the solenoid movable unit 53a, and the other end is supported by the spring pin 56. The solenoid spring 55 is compressed during the energization of the solenoid 53. After the energization, because a biasing force acts on the spring pin 56, the solenoid spring 55 has a function of returning the spring pin 56, the solenoid movable unit 53a, and the link 57 to reference positions.

The push-in detecting circuit board 45 is disposed so as to abut on the right cylindrical portion 39b of the right frame 39, and includes a third sensor 45a and a connector 45b thereon. The third sensor 45a is a photo-interrupter. The photo-interrupter includes the light emitting unit and the light receiving unit, and detects entry and exit of an object with respect to the space (object detection space) formed between the light emitting unit and the light receiving unit. The third sensor 45a transmits the on signal through the connector 45b when the object does not exist in the object detection space, and the third sensor 45a transmits the off signal through the connector 45b when the object exists in the object detection space. The push-in detecting circuit board 45 is disposed such that the push-in detecting flag 47b of the slider 47 is located in the object detection space of the third sensor 45a when the pushing-in operation is not performed on the operation unit 21.

(Configuration of Frame Unit 22)

The configuration of the frame unit 22 will be described below. FIGS. 7A and 7B are exploded perspective views of the frame unit 22. The vertical-horizontal switching unit 20 and the operation unit 21 are also illustrated in FIGS. 7A and 7B in order to clarify the positional relationship among the vertical-horizontal switching unit 20, the operation unit 21, and the frame unit 22.

As illustrated in FIGS. 7A and 7B, the frame unit 22 includes the lower main frame 18, a roller 19, a motor bearing 62, a motor 63, a vertical-horizontal switching detecting flag 64, a coupling 65, a main circuit board 66, an upper main frame 67, and a vertical-horizontal switching detecting circuit board 69. As illustrated in FIGS. 7A and 7B, in the vertical-horizontal switching unit 20 and the operation unit 21, a rear portion from the panel 58 is disposed and retained between the upper main frame 67 and the lower main frame 18.

The lower main frame 18 includes a groove unit 18a, a roller support 18b, a bearing support 18c, a main circuit board retaining unit 18d, and a motor support 18e. The groove unit 18a is formed at a front end of the lower main frame 18, and has a shape corresponding to the lower portion of the panel 58. The roller support 18b is formed at the position corresponding to the guide rail 49, the rail unit 39e, and the rail unit 40e, and the roller support 18b supports the roller 19 such that the roller 19 is rotatable in the plane perpendicular to the push-in direction. The roller 19 guides the rotational movement of the vertical-horizontal switching unit 20, and has a width equal to the rail width of the guide rail 49.

The bearing support 18c supports the motor bearing 62 such that the motor bearing 62 is rotatable in the plane (XY-plane) perpendicular to the push-in direction. The main circuit board retaining unit 18d is formed in the left wall surface, and includes a support hook 18d-1 that support the main circuit board 66 and an exposure window 18d-2.

A groove unit 67a having the shape corresponding to the upper portion of the panel 58 is formed at the front end of the upper main frame 67, and the groove unit 67a is connected to the groove unit 18a formed in the lower main frame 18, and rotatably retains the panel 58. The upper main frame 67 includes a sensor window 67b in the rear.

The motor 63 is a stepping motor, and includes a main shaft 63a which can rotate in the plane perpendicular to the push-in direction and stop at a predetermined angle. The motor 63 is supported by the motor support 18e of the lower main frame 18, and fixed to the lower main frame 18 by screws.

The vertical-horizontal switching detecting flag 64 is a substantial disc-shape member in which a first flag 64a and a second flag 64b are formed. The first flag 64a and the second flag 64b are formed so as to project toward the radial outside from the outer circumference, and the first flag 64a and the second flag 64b are formed so as to form a center angle of about 120 degrees. The vertical-horizontal switching detecting flag 64 includes a center hole having the diameter equal to that of the main shaft 63a of the motor 63, and is supported by the main shaft 63a. Therefore, the vertical-horizontal switching detecting flag 64 rotates integrally with the main shaft 63a.

The coupling 65 is a cylindrical member having a function of transmitting the rotational movement of the motor 63 to the coupling shaft 60. The front of the coupling 65 is connected to the connection unit 60b of the coupling shaft 60, and the rear is connected to the main shaft 63a of the motor 63. Therefore, the vertical-horizontal switching unit 20 and the operation unit 21 rotate integrally according to the rotation of the motor 63.

The motor bearing 62 is disposed outside the coupling 65 while being coaxial with the coupling 65, and the motor bearing 62 is supported by the bearing support 18c of the lower main frame 18.

The vertical-horizontal switching detecting circuit board 69 is fixed to the upper main frame 67 by screws, and includes a fourth sensor (first detection sensor) 69a and a fifth sensor (second detection sensor) 69b (see FIG. 15), which extend downward through the sensor window 67b. Each of the fourth sensor 69a and the fifth sensor 69b is a photo-interrupter. The photo-interrupter includes a light emitting unit and a light receiving unit, and detects entry and exit of an object with respect to a space (an object detection space, a detection region) formed between the light emitting unit and the light receiving unit. The vertical-horizontal switching detecting circuit board 69 is disposed such that the vertical-horizontal switching detecting flag 64 enters and exits from the object detection spaces of the fourth sensor 69a and fifth sensor 69b during the rotation of the motor 63.

The main circuit board 66 includes a plurality of connectors 66a, and is retained by the lower main frame 18. Some of the connectors 66a are exposed through the exposure window 18d-2 of the lower main frame 18. The controller of the slot machine 11 and the operation device 17 are connected to each other through the connector 66a.

(Operation of Operation Device 17 During Scrolling Operation)

Figure 8A:
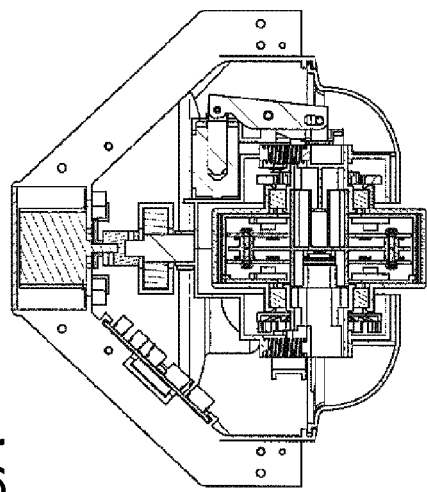
FIGS. 8A to 8D are schematic configuration diagrams illustrating the case that the operation unit of the operation device in FIG. 2 is vertically positioned.
Figure 8D:
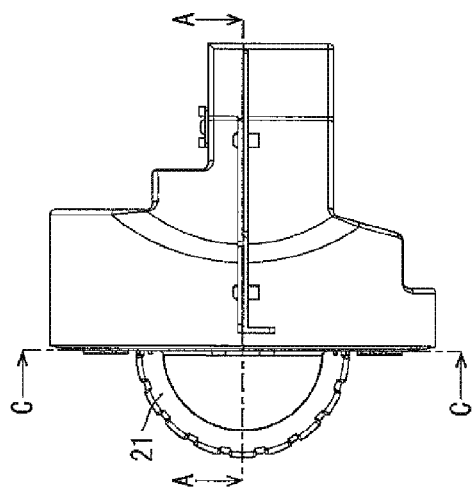
Figure 8C:
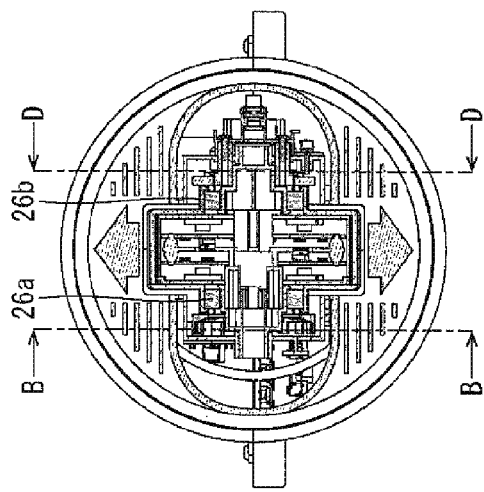
Figure 8B:
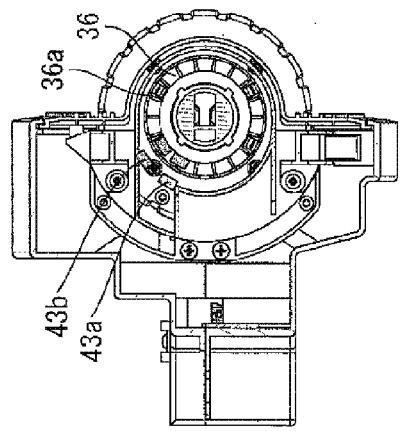

The operation of the operation device 17 during the scrolling operation will be described below. FIGS. 8A to 8D are schematic configuration diagrams illustrating the case that the operation unit 21 of the operation device 17 of one or more embodiments of the present invention is vertically positioned. FIG. 8A is a sectional view taken on line A-A in FIG. 8D, and FIG. 8B is a sectional view taken on line B-B in FIG. 8C. FIG. 8C is a sectional view taken on line C-C in FIG. 8D, and FIG. 8D is a front view illustrating the operation device 17 when the operation device 17 is viewed from the right.

As illustrated in FIG. 8D, the player can vertically rotate the operation unit 21 along the circumferential directions of the right case 23 and left case 35. When the operation unit 21 is rotated, the operation device 17 can receive the scrolling operation. When the operation unit 21 is rotated, the right case 23, the left case 35, the left diffusion case 34, and the right diffusion case 24 perform the rotational movement about the left shaft unit 31a and right shaft unit 31b through the bearing 26a and bearing 26b. At this point, because the scrolling detecting flag 36 and the left case 35 move integrally, the scrolling detecting flag 36 also performs the rotational movement. Therefore, the projections 36b of the scrolling detecting flag 36 enter and exit from the object detection spaces of the first sensor 43a and second sensor 43b that are included in the scrolling detecting circuit board 43.

Figure 9:
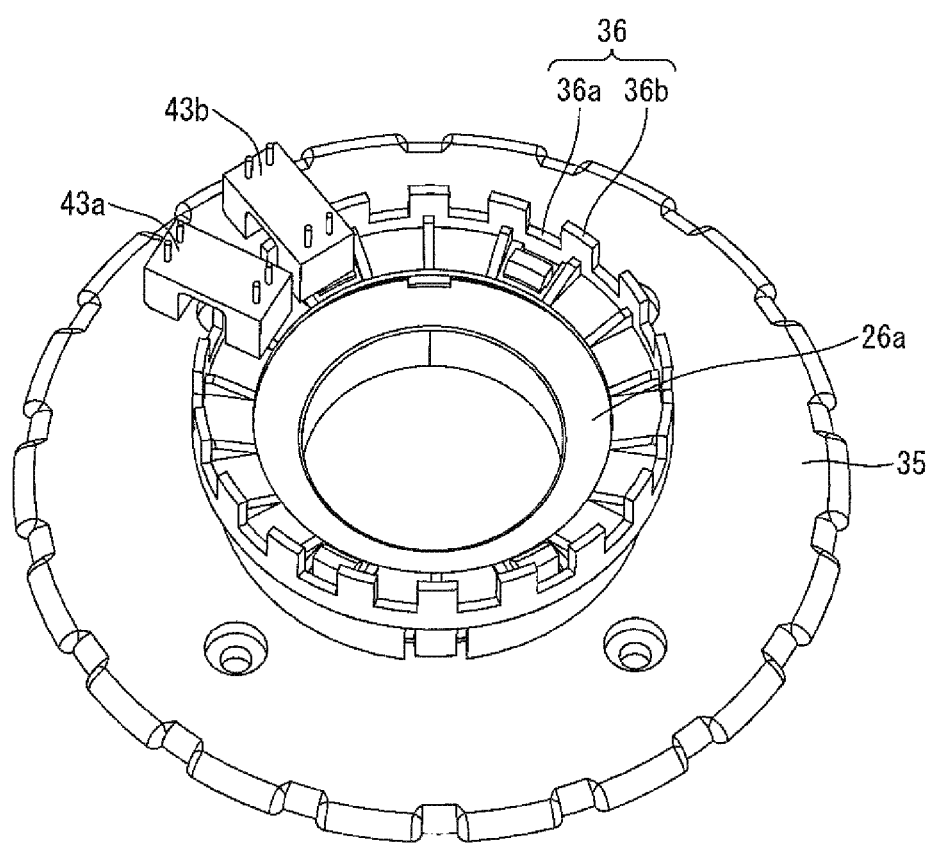
FIG. 9 is a partial schematic configuration diagram illustrating the operation unit included in the operation device of FIG. 2.

FIG. 9 is a partial schematic configuration diagram illustrating the operation unit 21 including the first sensor 43a, the second sensor 43b, the scrolling detecting flag 36, the bearing 26a, and the left case 35. As illustrated in FIG. 9, the interval between the plurality of projections 36b of the scrolling detecting flag 36 is shorter than the interval between the first sensor 43a and the second sensor 43b. Therefore, the output signals of the first sensor 43a and second sensor 43b vary depending on the rotational position of the scrolling detecting flag 36.

For example, when the operation unit 21 is scrolled downward (clockwise in FIG. 9), the output signals of the first sensor 43a and second sensor 43b vary in the following order.

(1) the output signal of the first sensor 43a changes from the off signal to the on signal (2) the output signal of the second sensor 43b changes from the off signal to the on signal (3) the output signal of the first sensor 43a changes from the on signal to the off signal (4) the output signal of the second sensor 43b changes from the on signal to the off signal (1) the output signal of the first sensor 43a changes from the off signal to the on signal (2) . . . .

On the other hand, when the operation unit 21 is scrolled upward (counterclockwise in FIG. 9), the output signals of the first sensor 43a and second sensor 43b vary in the following order.

(1') the output signal of the second sensor 43b changes from the off signal to the on signal (2') the output signal of the first sensor 43a changes from the off signal to the on signal (3') the output signal of the second sensor 43b changes from the on signal to the off signal (4') the output signal of the first sensor 43a changes from the on signal to the off signal (1') the output signal of the second sensor 43b changes from the off signal to the on signal (2') . . . .

Thus, the on and off switching order of the output signals of the first sensor 43a and second sensor 43b varies according to the rotation direction (scrolling direction). For this reason, both the existence or non-existence of the scrolling operation and the scrolling direction can be detected by monitoring the output signals of the first sensor 43a and second sensor 43b.

A rotation speed can be calculated by measuring a time interval of switching between the output signals of the first sensor 43a and second sensor 43b. For example, for the downward rotation, the rotation speed (scrolling speed) can be calculated by measuring the time interval between the time the output signal of the first sensor 43a changes from the off signal to the on signal and the time the output signal of the second sensor 43b changes from the on signal to the off signal.

Figure 10:
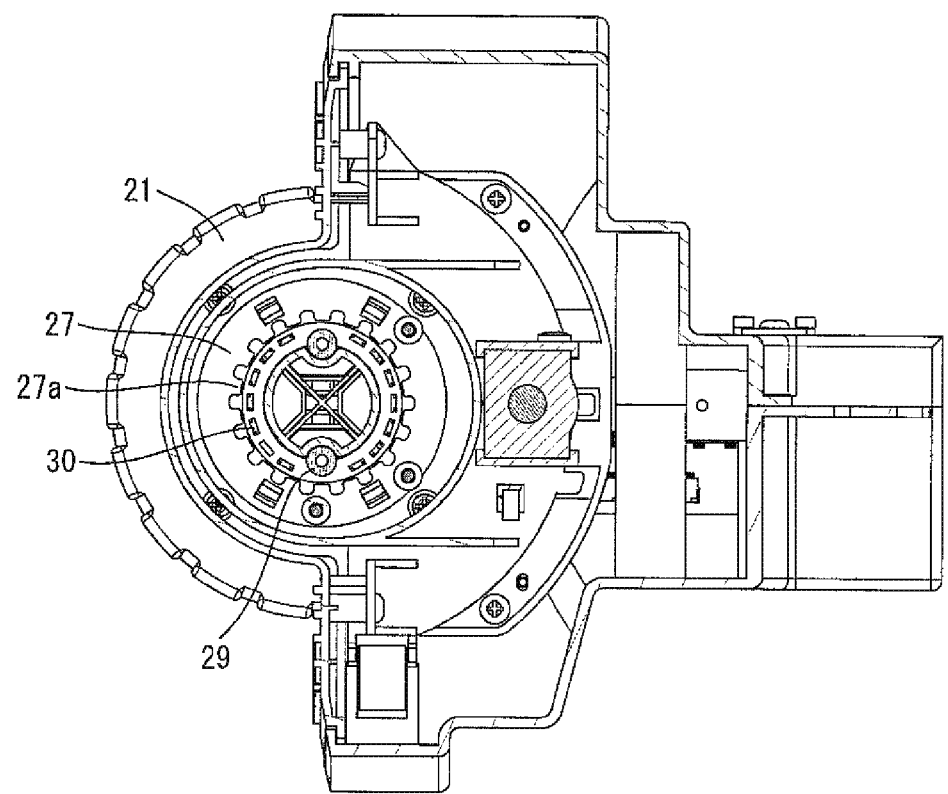
FIG. 10 is a sectional view taken on line D-D in FIG. 8C.

FIG. 10 is a sectional view taken on line D-D in FIG. 8C. Because the plate 27 moves integrally with the right case 23, the plate 27 also performs the rotational movement according to the scrolling operation of the player. The magnet 30 is disposed inside the plate 27 so as to face the projection 27a of the plate 27 (first state). The plate 27 is the magnetic member, and the magnetic force acts between the projection 27a and the magnet 30. Because the magnet 30 and the projection 27a face each other at the beginning of the scrolling operation, it is necessary to perform the scrolling operation against the magnetic force acting on the projection 27a and the magnet 30. When the rotation starts, the positions of the magnet 30 and projection 27a change relatively, and the distance between the projection 27a and the magnet 30 increases. Therefore, the player does not feel an influence of the magnetic force. When the rotation is further performed, the distance between the projection 27a and the magnet 30 decreases, and the attractive magnetic force acts.

Because the magnetic force acting between the projection 27a and the magnet 30 changes continuously, the player can obtain the continuously changing operational feeling during the scrolling operation. Because of the existence of the rotation position where the resistance force against the rotation of the operation unit 21 is strengthened, namely, the rotation position where the magnet 30 faces the projection 27a, the player can recognize the rotation position and obtain the latching feeling (click feeling) in performing the scrolling operation.

The performance effect can be enhanced by lighting the plurality of LEDs 32a included in the electric spectacular circuit boards 32 according to the scrolling operation. A lighting color may be changed between the scrolling operation and the non-operation, or changed according to the scrolling direction. A blinking speed may be changed according to the rotation speed (scrolling speed).

Figure 11:
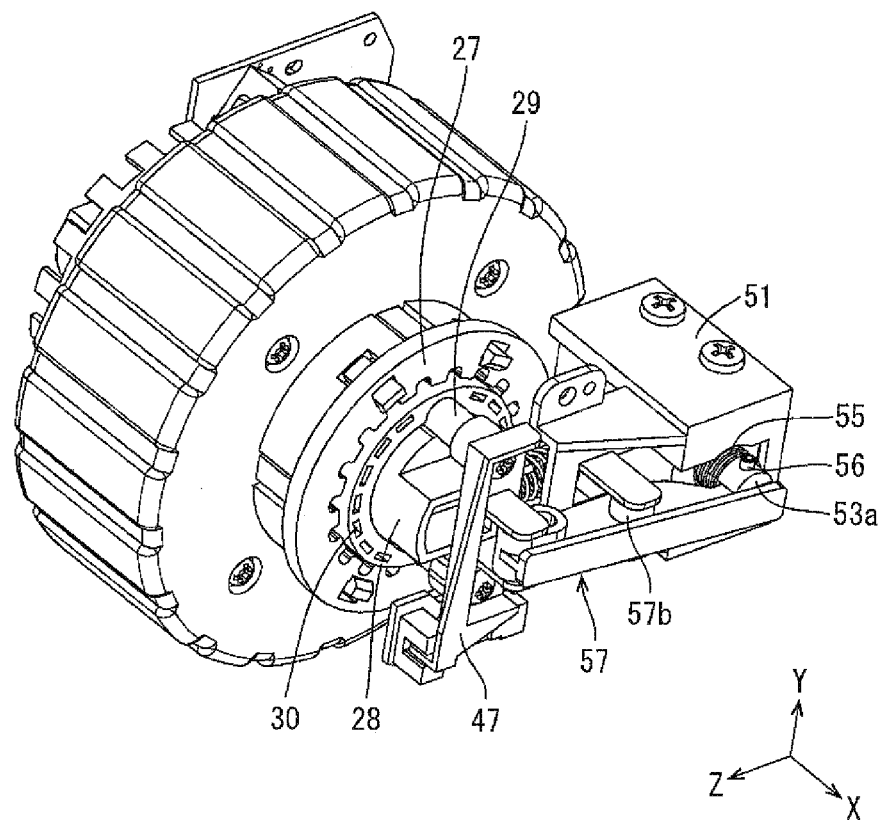
FIG. 11 is a perspective view illustrating the operation unit and the operational feeling switching unit during non-activation of a solenoid.

The scrolling operation of the operation unit 21 during the activation of the solenoid 53 will be described below. FIG. 11 is a partial schematic configuration diagram illustrating the operation device 17 during the non-activation of the solenoid 53, and FIG. 12 is a partial schematic configuration diagram illustrating the operation device 17 during the activation of the solenoid 53.

Figure 12:
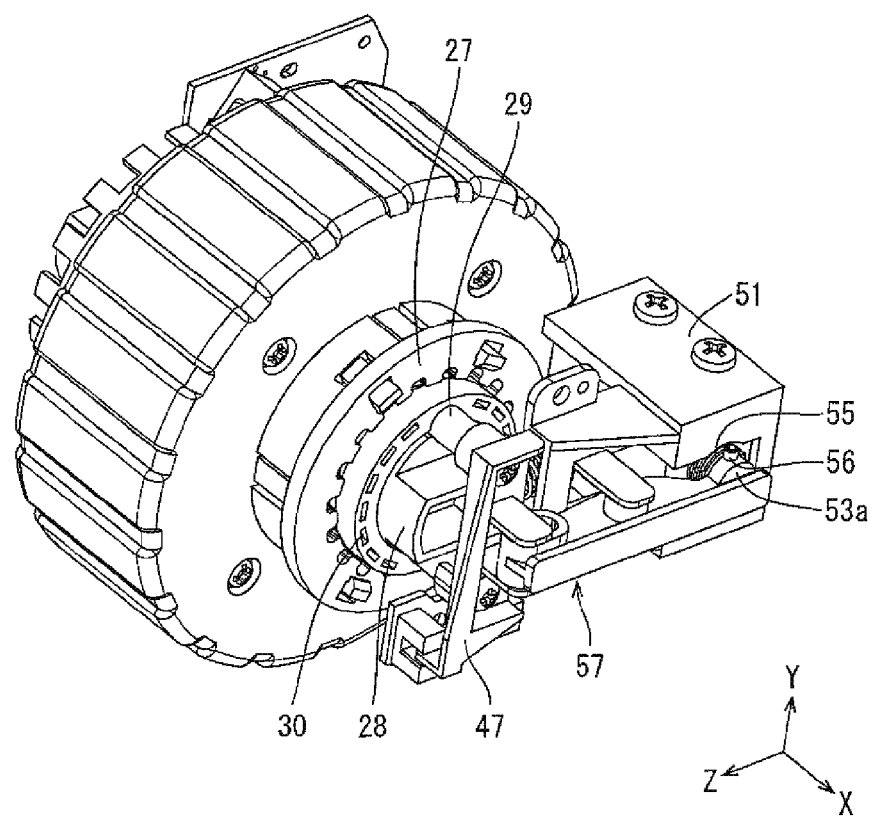
FIG. 12 is a perspective view illustrating the operation unit and the operational feeling switching unit during activation of the solenoid.

As illustrated in FIG. 12, when excited by the energization, the solenoid 53 attracts the solenoid movable unit 53a onto the side (the left) of the solenoid fixing unit 53b. When the solenoid movable unit 53a is attracted, the spring pin 56 fixed to the solenoid movable unit 53a is attracted while compressing the solenoid spring 55, and the rear portion of the link 57 is simultaneously attracted. When the rear portion of the link 57 is attracted, the link 57 performs the turning movement in which the front portion moves rightward with the second hole 57b as the supporting point. Because the slider 47 moves integrally with the link 57 in the horizontal direction, the slider 47 also moves rightward. Because the slider 47 moves integrally with the magnet holder 29, the magnet holder 29 also moves rightward.

That is, when the solenoid 53 is excited, the magnet holder 29 moves to the right. Therefore, the magnet holder 29 moves from the inside of the plate 27 (the state (second state) in which the magnet 30 is not located inside the plate 27), and the magnetic force acting between the magnet 30 and the plate 27 becomes almost negligible.

When performing the scrolling operation on the operation unit 21 during the activation of the solenoid 53, the player can obtain the operational feeling different from that of the non-activation of the solenoid. Specifically, the player can obtain the smooth operational feeling compared with the non-activation of the solenoid.

When the energization of the solenoid 53 is ended, the magnet holder 29, the slider 47, the link 57, the solenoid movable unit 53a, and the spring pin 56 are returned to the positions in the non-activation state of the solenoid 53 by the biasing force of the solenoid spring 55.

Thus, in the operation device 17 according to one or more embodiments of the present invention, the high performance effect can be obtained because the player can obtain the different operational feelings between the activation and non-activation states of the solenoid 53.

(Operation of Operation Device 17 During Pushing-In Operation)

The operation of operation device 17 during the pushing-in operation will be described below.

Figure 13:
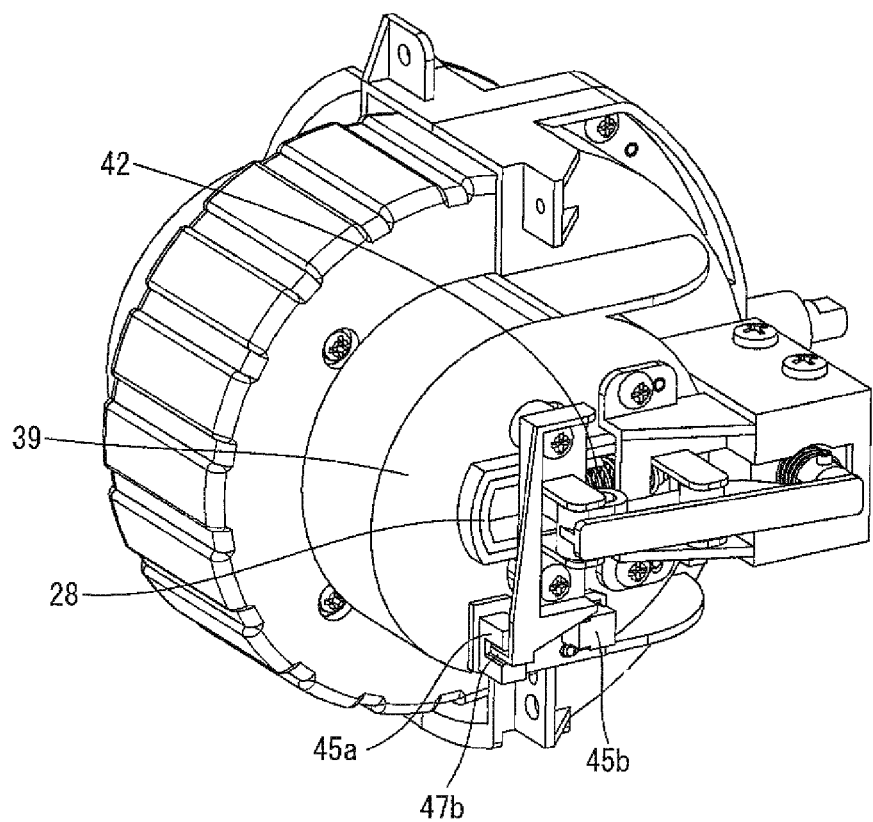
FIG. 13 is a perspective view illustrating the operation unit and the vertical-horizontal switching unit when a pushing-in operation is not performed on the operation unit.
Figure 14:
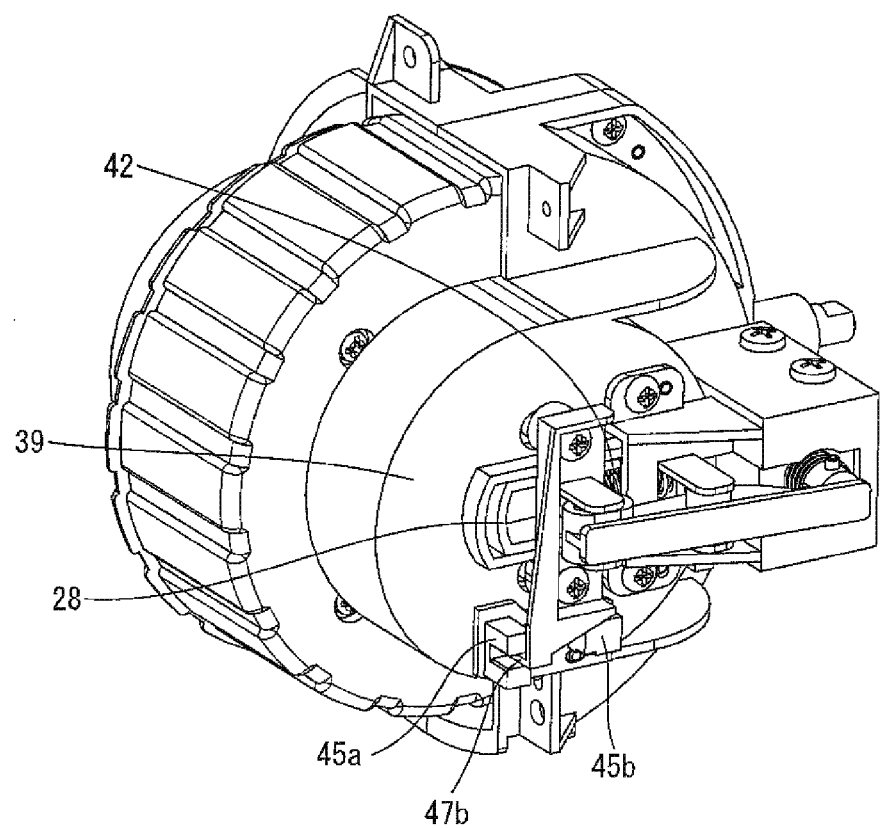
FIG. 14 is a perspective view illustrating the operation unit and the vertical-horizontal switching unit when the pushing-in operation is performed on the operation unit.

FIG. 13 is a partial schematic configuration diagram illustrating the operation device 17 in the unoperated state, and FIG. 14 is a partial schematic configuration diagram illustrating the operation device 17 during the pushing-in operation.

As illustrated in FIG. 14, when the player performs the pushing-in operation on the operation unit 21, the operation unit 21 and the slider 47 integrally move rearward while compressing the push-in spring 42. When the slider 47 moves rearward in association with the pushing-in operation, the push-in detecting flag 47b of the slider 47 escapes from the object detection space of the third sensor 45a included in the push-in detecting circuit board 45. Therefore, the push-in detecting circuit board 45 transmits the on signal through the connector 45b.

When the pushing-in operation is ended, the push-in spring 42 returns, and the operation unit 21 and the slider 47 return to the positions in the unoperated state. Accordingly, the push-in detecting flag 47b also returns to the object detection space of the third sensor 45a, and the push-in detecting circuit board 45 transmits the off signal.

The plurality of LEDs 32a included in the electric spectacular circuit boards 32 may be lit according to the pushing-in operation.

(Operation of Operation Device 17 During Activation of Motor 63)

Figure 15:
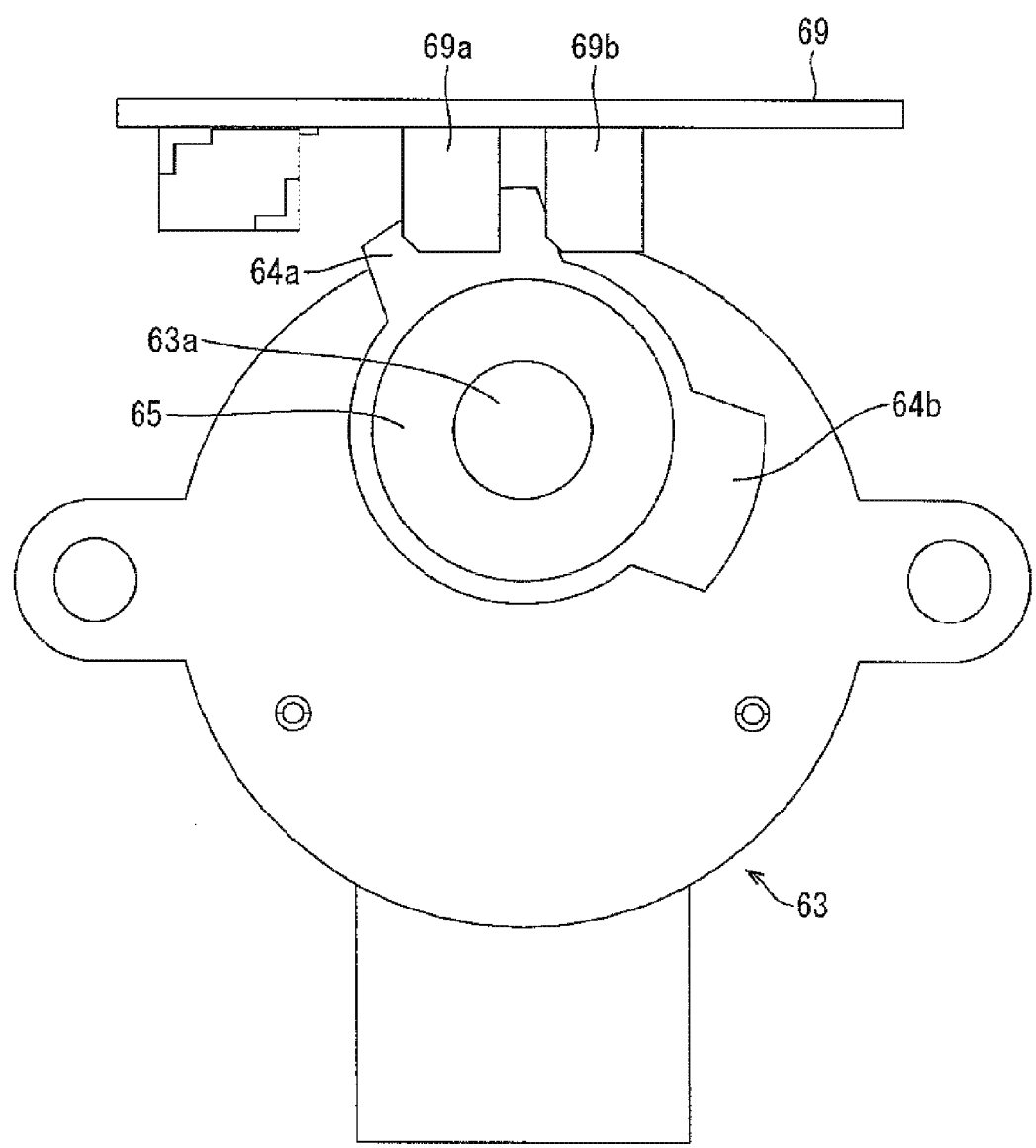
FIG. 15 is a front view illustrating a vertical-horizontal switching detecting circuit board, a coupling, a motor, and a vertical-horizontal switching detecting flag during the non-activation of the motor.

The operation of the operation device 17 during the activation of the motor 63 will be described below. FIG. 15 is a front view illustrating vertical-horizontal switching detecting circuit board 69, the coupling 65, the motor 63, and the vertical-horizontal switching detecting flag 64 during the non-activation of the motor 63. As illustrated in FIG. 15, during the non-activation of the motor 63, the first flag 64a of the vertical-horizontal switching detecting flag 64 blocks the light of the fourth sensor 69a of the vertical-horizontal switching detecting circuit board 69. Therefore, the fourth sensor 69a transmits the on signal, and the fifth sensor 69b transmits the off signal.

When the motor 63 is activated, the main shaft 63a and the vertical-horizontal switching detecting flag 64 start the counterclockwise rotation when viewed from the front (+Z-direction). That is, the main shaft 63a and the vertical-horizontal switching detecting flag 64 rotate about the rotation axis (second rotation axis) parallel to the axis Z. The vertical-horizontal switching unit 20 and the operation unit 21 also rotate integrally with the main shaft 63a through the coupling 65 and coupling shaft 60. During the rotation, in the vertical-horizontal switching unit 20, the panel 58 is guided by the groove unit 18a and groove unit 67a, and the guide rail 49 is guided by the roller 19.

When the vertical-horizontal switching detecting flag 64 rotates, the first flag 64a escapes from the fourth sensor 69a, and both the fourth sensor 69a and the fifth sensor 69b transmit the off signal. When the vertical-horizontal switching detecting flag 64 further rotates, the light of the fifth sensor 69b is blocked by the second flag 64b, the fourth sensor 69a transmits the off signal, and the fifth sensor 69b transmits the on signal. When the fourth sensor 69a is turned off while the fifth sensor 69b is turned on, the rotation of the motor 63 is stopped.

Figure 16:
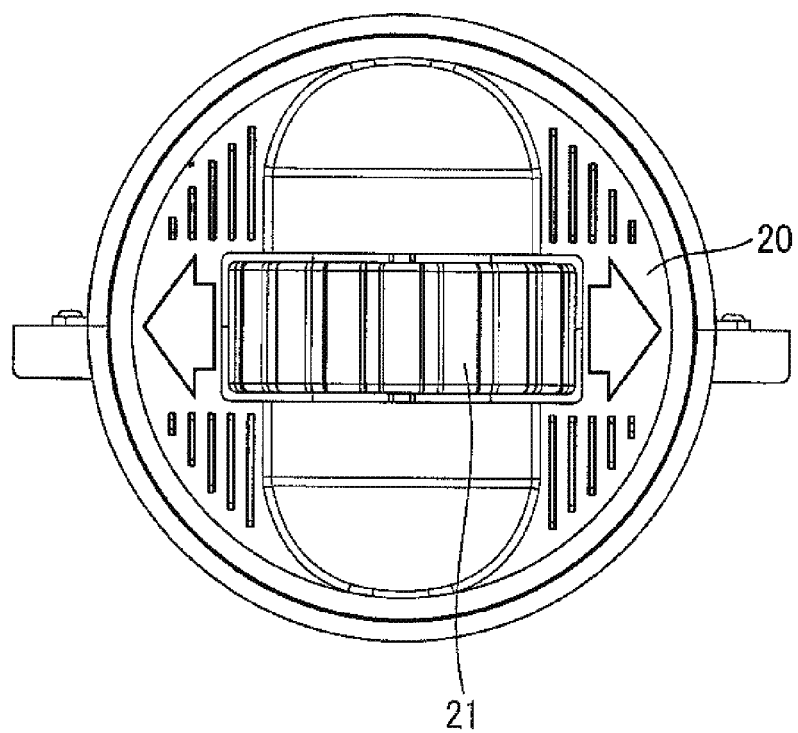
FIG. 16 is a front view illustrating a state in which the operation device in FIG. 2 is horizontally positioned.

At this point, as illustrated in FIG. 16, the vertical-horizontal switching unit 20 and the operation unit 21 have rotated counterclockwise by 90 degrees (horizontal position) compared with the pre-activation of the motor 63. Thus, the rotation axis (first rotation axis) of the operation unit 21 is switched. Therefore, the player can horizontally perform the scrolling operation of the operation unit 21, and obtain the operational feeling different from that of the pre-activation of the motor 63. Therefore, the high performance effect can be obtained.

In one or more of the above embodiments, the direction of the scrolling operation is switched from the vertical position to the horizontal position. Alternatively, the direction of the scrolling operation may be switched from the horizontal position to the vertical position. Additionally, the performance effect can further be enhanced by controlling the rotation direction and rotation speed of the motor 63. The lighting color of the LEDs 32a may differ between the cases of the vertical position and horizontal position.

In one or more of the above embodiments, the rotation axis of the operation unit 21 is located on the XY-plane, namely, the plane perpendicular to the axis Z that is of the rotation axis of the vertical-horizontal switching unit 20. However, the rotation axis of the operation unit 21 is not limited to the XY-plane. For example, the rotation axis of the operation unit 21 may be oblique to the XY-plane. That is, the rotation axis of the operation unit 21 merely needs to be in the direction different from the axis Z.

In one or more of the above embodiments, the plate 27 is made of the magnetic material, and the magnet holder 29 holds the magnet 30. Alternatively, a magnet may be disposed in the projection 27a of the plate 27 made of a non-magnetic material, and the magnet holder 29 may hold a magnetic material (for example, a ferromagnetic material such as iron) instead of the magnet 30.

In one or more of the above embodiments, the plate 27 includes the projections 27a inside the plate 27, and the magnet 30 is located on the radial inside of the plate 27 during the non-activation of the solenoid 53. Alternatively, the plate 27 may include the projections 27a on the radial outside of the plate 27, and the magnet 30 may be located outside the plate 27 during the non-activation of the solenoid 53. That is, the plate 27 may be disposed in coaxial with the rotation axis of the operation unit 21, and include the projections 27a projecting toward the radial outside, and the magnet 30 may be disposed on the circumference having the diameter larger than the outer diameter of the plate 27, located on the radial outside of the plate 27 during the non-activation of the solenoid 53, and not be located on the radial outside of the plate 27 during the activation of the solenoid 53.

In one or more of the above embodiments, the annular plate 27 made of the magnetic material includes the projections. Alternatively, the plate 27 may be made of a non-magnetic material, and a magnetic member may be disposed in each of the projections. In this case, the plurality of magnetic members are disposed at predetermined intervals on the circumference about the rotation axis of the operation unit 21. The magnet 30 may be located on the radial inside or outside of the magnetic member during the non-activation of the solenoid 53, and the magnet 30 may not be located on the radial outside or inside of the magnetic member during the activation of the solenoid 53.

In one or more of the above embodiments, the plate 27 operates integrally with the operation unit 21, and the magnet 30 moves according to the activation of the solenoid 53. Alternatively, the magnet 30 may operate integrally with the operation unit 21, and the plate 27 may move according to the activation of the solenoid 53.

The present invention is not limited to the above embodiments, and various changes can be made without departing from the scope of the claims. It is noted that embodiments obtained by a combination of different embodiments are also included in the scope of the present invention.

One or more embodiments of the present invention can be applied to the operation device included in the play machine.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. An operation device for performing an operation input on a play machine, comprising:
    an operation unit;
    a support that rotatably supports the operation unit;
    a first magnetic member that rotates integrally with the operation unit;
    a second magnetic member in which a magnetic force acts between the first magnetic member and the second magnetic member; and a switching unit that switches a distance between the first magnetic member and the second magnetic member, wherein one of the first magnetic member and the second magnetic member is a magnet, and wherein the other of the first magnetic member and the second magnetic member is a magnetic material on which an attractive force of the magnet is exerted by a magnetic force of the magnet, wherein the other of the first magnetic member and the second magnetic member has an annular shape comprising a projection projecting toward a radial inside, and is disposed coaxially with a rotation axis of the operation unit, wherein the one of the first magnetic member and the second magnetic member comprises at least one magnetic member and is disposed at predetermined intervals on a circumference about the rotation axis of the operation unit, the circumference having a diameter smaller than an inner diameter of the annular shape of the other of the first magnetic member and the second magnetic member, and wherein the switching unit moves the second magnetic member in a rotation axis direction of the operation unit to switch between a first state in which the one of the first magnetic member and the second magnetic member is located on the radial inside of the other having the annular shape and a second state in which the one of the first magnetic member and the second magnetic member is not located on the radial inside of the other.

2. The operation device according to claim 1, wherein the support supports the operation unit such that a pushing-in operation can be performed, and wherein the support supports the operation unit such that the rotation axis of the operation unit is perpendicular to a push-in direction.

3. The operation device according to claim 1, wherein the switching unit is a solenoid.

4. An operation device for performing an operation input on a play machine, comprising:

an operation unit;

a support that rotatably supports the operation unit;

a first magnetic member that rotates integrally with the operation unit;

a second magnetic member in which a magnetic force acts between the first magnetic member and the second magnetic member; and a switching unit that switches a distance between the first magnetic member and the second magnetic member, wherein one of the first magnetic member and the second magnetic member is a magnet, and wherein the other of the first magnetic member and the second magnetic member is a magnetic material on which an attractive force of the magnet is exerted by a magnetic force of the magnet, wherein the other of the first magnetic member and the second magnetic member has an annular shape comprising a projection projecting toward a radial outside, and is disposed coaxially with a rotation axis of the operation unit, wherein the one of the first magnetic member and the second magnetic member comprises at least one magnetic member and is disposed at predetermined intervals on a circumference about the rotation axis of the operation unit, the circumference having a diameter larger than an outer diameter of the annular shape of the other of the first magnetic member and the second magnetic member, and wherein the switching unit moves the second magnetic member in a rotation axis direction of the operation unit to switch between a first state in which the one of the first magnetic member and the second magnetic member is located on the radial outside of the other having the annular shape and a second state in which the one of the first magnetic member and the second magnetic member is not located on the radial outside of the other.

5. The operation device according to claim 4, wherein the support supports the operation unit such that a pushing-in operation can be performed, and wherein the support supports the operation unit such that the rotation axis of the operation unit is perpendicular to a push-in direction.

6. The operation device according to claim 4, wherein the switching unit is a solenoid.

7. An operation device for performing an operation input on a play machine, comprising:

an operation unit;

a support that rotatably supports the operation unit;

a first magnetic member that rotates integrally with the operation unit;

a second magnetic member in which a magnetic force acts between the first magnetic member and the second magnetic member; and a switching unit that switches a distance between the first magnetic member and the second magnetic member, wherein one of the first magnetic member and the second magnetic member is a magnet, and wherein the other of the first magnetic member and the second magnetic member is a magnetic material on which an attractive force of the magnet is exerted by a magnetic force of the magnet, wherein the other of the first magnetic member and the second magnetic member comprises a plurality of magnetic members and the plurality of magnetic members are disposed at predetermined intervals on a circumference about a rotation axis of the operation unit, wherein the one of the first magnetic member and the second magnetic member comprises at least one magnetic member and is disposed at predetermined intervals on a circumference about the rotation axis of the operation unit, and wherein the switching unit moves the second magnetic member in a rotation axis direction of the operation unit to switch between a first state in which the one of the first magnetic member and the second magnetic member is located on a radial outside or a radial inside of the other and a second state in which the one of the first magnetic member and the second magnetic member is not located on the radial outside or the radial inside of the other.

8. The operation device according to claim 7, wherein the switching unit is a solenoid.

9. An operation device for performing an operation input on a play machine, comprising:

an operation unit;

a support that rotatably supports the operation unit;

a first magnetic member that rotates integrally with the operation unit;

a second magnetic member in which a magnetic force acts between the first magnetic member and the second magnetic member; and a switching unit that switches a distance between the first magnetic member and the second magnetic member, wherein the support supports the operation unit such that a pushing-in operation can be performed, and wherein the support supports the operation unit such that the rotation axis of the operation unit is perpendicular to a push-in direction.

10. The operation device according to claim 9, wherein the switching unit is a solenoid.

11. An operation device for performing an operation input on a play machine, comprising:
- an operation unit;
- a support that rotatably supports the operation unit;
- a first magnetic member that rotates integrally with the operation unit;
- a second magnetic member in which a magnetic force acts between the first magnetic member and the second magnetic member; and
- a switching unit that switches a distance between the first magnetic member and the second magnetic member,
- wherein the switching unit is a solenoid.

12. An operation device for performing an operation input on a play machine, comprising:
- an operation unit;
- a support that rotatably supports the operation unit;
- a first magnetic member that rotates integrally with the operation unit a second magnetic member in which a magnetic force acts between the first magnetic member and the second magnetic member; and
- a switching unit that switches a distance between the first magnetic member and the second magnetic member,
- wherein one of the first magnetic member and the second magnetic member is a magnet, and
- wherein the other of the first magnetic member and the second magnetic member is a magnetic material on which an attractive force of the magnet is exerted by a magnetic force of the magnet,
- wherein the support supports the operation unit such that a pushing-in operation can be performed, and
- wherein the support supports the operation unit such that the rotation axis of the operation unit is perpendicular to a push-in direction.

13. An operation device for performing an operation input on a play machine, comprising:
- an operation unit;
- a support that rotatably supports the operation unit;
- a first magnetic member that rotates integrally with the operation unit;
- a second magnetic member in which force acts between the first magnetic member and the second magnetic member; and
- a switching unit that switches a distance between the first magnetic member and the second magnetic member,
- wherein one of the first magnetic member and the second magnetic member is a magnet, and
- wherein the other of the first magnetic member and the second magnetic member is a magnetic material on which an attractive force of the magnet is exerted by a magnetic force of the magnet,
- wherein the switching unit is a solenoid.

* * * * *